(12) United States Patent
Nishio et al.

(10) Patent No.: US 9,808,932 B2
(45) Date of Patent: Nov. 7, 2017

(54) LINKING APPARATUS CONTROL DEVICE

(71) Applicants: Yukihiro Nishio, Iwata (JP); Hiroshi Isobe, Iwata (JP); Hiroyuki Yamada, Iwata (JP)

(72) Inventors: Yukihiro Nishio, Iwata (JP); Hiroshi Isobe, Iwata (JP); Hiroyuki Yamada, Iwata (JP)

(73) Assignee: NTN CORPORATION, Osaka (JP)

( * ) Notice: Subject to any disclaimer, the term of this patent is extended or adjusted under 35 U.S.C. 154(b) by 239 days.

(21) Appl. No.: 14/864,412

(22) Filed: Sep. 24, 2015

(65) Prior Publication Data

US 2016/0008977 A1    Jan. 14, 2016

Related U.S. Application Data

(63) Continuation of application No. PCT/JP2014/057191, filed on Mar. 17, 2014.

(30) Foreign Application Priority Data

Mar. 26, 2013 (JP) ................. 2013-063948
Jul. 29, 2013 (JP) ................. 2013-156546

(51) Int. Cl.
*G05B 15/00* (2006.01)
*G05B 19/00* (2006.01)
(Continued)

(52) U.S. Cl.
CPC .......... *B25J 9/1607* (2013.01); *B25J 9/0048* (2013.01); *B25J 9/06* (2013.01); *B25J 9/1605* (2013.01);
(Continued)

(58) Field of Classification Search
None
See application file for complete search history.

(56) References Cited

U.S. PATENT DOCUMENTS

| 5,890,396 A | 4/1999 | Kaneko et al. |
| 5,893,296 A | 4/1999 | Rosheim |

(Continued)

FOREIGN PATENT DOCUMENTS

| CN | 1836849 A | 9/2006 |
| CN | 102892559 A | 1/2013 |

(Continued)

OTHER PUBLICATIONS

Japanese Office Action dated Apr. 4, 2017 in corresponding Japanese Patent Application No. 2013-156546.

(Continued)

*Primary Examiner* — Bhavesh V Amin

(57) ABSTRACT

A control device is provided which is operable to change the position of a distal end side link hub by driving each of arms, which are proximal end side links of a plurality of link mechanisms by means of an actuator. When in a series of operations, the position change of the distal end side link hub is mad by an angle greater than a predetermined angle, a relay position setting unit is provided for setting a relay point between a starting point and a terminating point of each of the arms so that the interference of the three axis arms may be relieved. A position change control unit performs a position control so as to pass simultaneously through the relay point so set.

18 Claims, 20 Drawing Sheets

(51) Int. Cl.
    *B25J 9/16* (2006.01)
    *B25J 9/00* (2006.01)
    *B25J 9/06* (2006.01)
    *G05B 19/4103* (2006.01)

(52) U.S. Cl.
    CPC ........... *B25J 9/1623* (2013.01); *B25J 9/1664* (2013.01); *G05B 19/4103* (2013.01); *G05B 2219/39052* (2013.01); *G05B 2219/39219* (2013.01); *G05B 2219/39403* (2013.01); *G05B 2219/40267* (2013.01); *G05B 2219/40436* (2013.01); *Y10S 901/02* (2013.01)

(56) References Cited

U.S. PATENT DOCUMENTS

| | | | |
|---|---|---|---|
| 8,055,383 | B2 | 11/2011 | Yoshizawa |
| 9,073,204 | B2 | 7/2015 | Isobe et al. |
| 2005/0159075 | A1* | 7/2005 | Isobe ................... B25J 17/0266 446/104 |
| 2009/0019410 | A1 | 1/2009 | Yoshizawa |
| 2012/0043100 | A1* | 2/2012 | Isobe ................. A61B 17/1631 173/42 |
| 2012/0089246 | A1 | 4/2012 | Mitani et al. |
| 2013/0055843 | A1* | 3/2013 | Isobe ....................... F16C 1/02 74/490.04 |
| 2013/0192420 | A1 | 8/2013 | Isobe et al. |
| 2014/0224046 | A1* | 8/2014 | Isobe ................... B25J 9/0048 74/89.14 |

FOREIGN PATENT DOCUMENTS

| | | |
|---|---|---|
| JP | 08-118270 | 5/1996 |
| JP | 10-286788 | 10/1998 |
| JP | 2000-094245 | 4/2000 |
| JP | 2002-273676 | 9/2002 |
| JP | 2005-069462 | 3/2005 |
| JP | 2005-226777 | 8/2005 |
| JP | 2005-299828 | 10/2005 |
| JP | 2005-309990 | 11/2005 |
| JP | 2009-214211 | 9/2009 |
| JP | 2011-240440 | 12/2011 |
| JP | 2012-66323 | 4/2012 |
| JP | 2012-082937 | 4/2012 |
| WO | WO 2006/121091 A1 | 11/2006 |
| WO | WO 2011/004584 A1 | 1/2011 |

OTHER PUBLICATIONS

Chinese Office Action dated Jun. 21, 2016 in corresponding Chinese Patent Application No. 201480016785.X.
International Search Report dated Jun. 17, 2014 in corresponding international application PCT/JP2014/057191.
PCT International Preliminary Report on Patentability dated Oct. 8, 2015 in corresponding International Patent Application No. PCT/JP2014/057191.

* cited by examiner

LINKING APPARATUS CONTROL DEVICE

CROSS REFERENCE TO THE RELATED APPLICATION

This application is a continuation application, under 35 U.S.C. §111(a), of international application No. PCT/JP2014/057191, filed Mar. 17, 2014, which claims priority to Japanese patent application No. 2013-063948, filed Mar. 26, 2013 and Japanese patent application No. 2013-156546, filed Jul. 29, 2013, the disclosure of which are incorporated by reference in their entirety into this application.

BACKGROUND OF THE INVENTION

Field of the Invention

The present invention relates to a control device for a link actuator that is used in equipment such as, for example, medical device or industrial device that requires a precise and wide operating range.

Description of Related Art

One example of working device equipped with a parallel link mechanism is disclosed in the Patent Document 1 listed below. Since the parallel link mechanism used in this working device has a plurality of links each having such a small operating range that the link length need be increased if the operating range of a travelling plate is desired to be expanded. Also, if the link length is increased, reduction in rigidity of the mechanism in its entirety results in. For this reason, there has been recognized such a problem that the weight of a tool mounted on the travelling plate, that is, the weight capacity of the travelling plate is limited to a small one.

In order to alleviate the foregoing problem, a link actuator provided with three or more sets of link mechanisms in quadric crank chain has been suggested (in, for example, the patent documents 2 and 3 listed below). According to the suggested link actuator, the operation within a precise and wide operating range is possible while it is compact in size.

FIGS. 22 and 23 of the accompanying drawings illustrate one example of the link actuator provided with three or more link mechanisms in trinodal crank chain. The illustrated link actuator 1 includes a proximal end side link hub 14, a distal end side link hub 15, and three link mechanisms 11, 12 and 13 each connecting those link hubs 14 and 15 together. Each of the link mechanisms 11, 12 and 13 is made up of a proximal side end link member 11a, 12a or 13a, a distal side end link member 11b, 12b or 13b and an intermediate link 11c, 12c or 13c, all cooperating to define a corresponding link mechanism in the trinodal crank chain comprised of four revolute pairs. It is to be noted that in FIGS. 22 and 23, the distal side end link member 13a is not illustrated for the sake of clarity. Also, the distal side end link members 11a, 12a and 13a are hereinafter referred to as arms 11a, 12a and 13a, respectively.

According to the above described link actuator of the structure discussed above, a proximal end side link hub 14, a distal end side link hub 15 and three set of link mechanisms 11, 12 and 13 cooperate with each other to form a mechanism of two degree of freedom in which the distal end side link hub 15 is movable relative to the distal end side link hub 14 in two axial directions perpendicular to each other. This two degree of freedom mechanism, while compact in size, is capable of providing the distal end side link hub 15 with a large operating range. By way of example, the maximum bending angle between the center axis QA of the proximal end side link hub 14 and the center axis QB of the distal end side link hub 15 is about ±90 degree and the pivot angle φ of the distal end side link hub 15 relative to the proximal end side link hub 14 can be set to the range of 0 to 360 degree.

PRIOR ART DOCUMENT

Patent Document 1: JP Laid-open Patent Publication No. 2000-94245
Patent Document 2: U.S. Pat. No. 5,893,296
Patent Document 3: JP Laid-open Patent Publication No. 2011-240440
Patent Document 4: Japanese Patent No. 4476603

SUMMARY OF THE INVENTION

In the link actuator provided with three sets of link mechanisms 11, 12 and 13 in trinodal crank chain such as shown in FIGS. 22 and 23, where the link mechanisms 11, 12 and 13 having two degrees of freedom are to be driven by actuators (not shown) such as, for example, three motors, the position of the distal end side link hub 15 is determined by means of the bending angle θ and the angle of pivot φ. The bending angle θ is an angle of inclination of a center axis QB of the distal end side link hub 15 relative to a center axis QA of the proximal end side link hub 14 and the pivot angle φ is an angle of pivot of the center axis QB of the distal end side link hub 15 relative to the center axis QA of the proximal end side link hub 14. From the bending angle θ and the pivot angle φ, the rotational angle of each of the arms 11a, 12a and 13a (hereinafter referred to as "arm rotational angle") ($\beta 1n$, $\beta 2n$ and $\beta 3n$) is determined and is positioned by the actuator for driving the arm 11a, 12a and 13a.

By way of example, with respect to a certain position A (θa, φa) of the distal end side link hub 15 and the position B (θb, φb) thereof, each arm rotational angle corresponding to the respective position can be determined, as A ($\beta 1a$, $\beta 2a$, $\beta 3a$), B ($\beta 1b$, $\beta 2b$, $\beta 3b$) from the relational equation of the proximal end side and distal end side link hub 14 and 15 and the arm rotational angle. The movement from the position A to the position B is executed as the rotational angle of each of the arms 11a, 12a and 13a moves from $\beta 1a$ to $\beta 1b$, from $\beta 2a$ to $\beta 2b$ and from $\beta 3a$ to $\beta 3b$.

The relationship between the command value of the arm rotational angle β and the bending angles θ is shown by the dotted line L1 to L3 in FIG. 24. As shown therein, by way of example, where the position change is to be accomplished by changing the bending angle θ from −60 degree to 60 degrees in a condition while the pivot angle is fixed at 15 degrees, each of the arms 11a, 12a and 13a is controlled from the starting point A to the terminating point B with the three arms 11a, 12a and 13a synchronized with a constant velocity movement in synchronism on the point-to-point control.

However, if the respective arm rotational angle is determined by dividing the bending angle θ for, for example, −60 degree, −45 degree and −30 degree and using the distal end side link hub 15 and the arm rotational angle from the position of each of the leading side end link hubs 15, each position is fixed according to the path following curved lines M1 to M3 as shown by the solid lines in FIG. 24. As can readily be understood from such figure, the misfit of the path is large in the vicinity of the bending angle 0 degree particularly in the curve L1 and the curve M1.

As discussed above, if drive along the path shown by the curves L1 to L3 is commanded, as compared with the command of driving along the path shown by the curves M1 to M3, the positioning command will be issued so that each arm rotational angle β1, β2 and β3 may pass a position in which the position of each arm 11a, 12a, 13a on in the course except for the starting point and the terminating point, which is greatly different from the relational equation between the link hub and the arm pivot angle.

Since in this condition each arm 11a, 12a and 13a is connected with each other and the relative position of the three arm rotational angles are uniquely fixed by the position of the distal end side link hub 15, the relative position of the arm rotational angles breaks and the three arms 11a, 12a and 13a come to interfere excessively. In other words, the three arms 11a, 12a and 13a assume such arm rotational angles that resulted in a deviation relative to the command values towards the respective actuators. For this reason, a further large torque is required in driving the link along the path of the curves L1 to L3.

Since this means that, because as the position changing amount is large for each drive, a positioning command, which direct to a position greatly different from the arm rotational angle that is fixed by the relational equation between the proximal end side and distal end side link hubs 14 and 15 and the arm rotational angle β in the course of the path, is issued, interference occurs between each arm 11a, 12a, 13a and an excessive torque is needed to drive the link mechanisms 11, 12 and 13. A load is imposed in this condition on the link mechanism 11, 12, 13 and/or an assembling inconvenience and/or an abnormal friction or the like result in, which leads to a cause of deterioration in positioning accuracy. In order to alleviate them, the need is recognized that each of the arms has to be driven so as to follow the path proximate to the curves M1 to M3 shown in FIG. 24.

However, it has been found that the control of the rotational angle of each of the arms 11a, 12a and 13a in such a manner as to avoid the occurrence of the interference (that is, deviation with a position determined by the relation of the three link mechanisms 11, 12 and 13 with the command value) on all of the paths from a position A to a position B of the distal end side link hub 15 results in such a problem that the moving time may be elongated since a conversion calculating time in to the rotational angle from the position of the distal end side link hub 15 to each of the arms 11a, 12a and 13a is needed. Also, where the control is done while the coordinates of the entire path has been stored, a problem arises in that a further large storage memory is required.

In view of the foregoing, an object of the present invention is to provide a control device for a link actuator in which, when the position of the distal end side link hub is to be largely changed, the positioning control of the actuator of each of the arms can be accomplished without departing considerably from each of the arm rotational angles that are uniquely fixed by the mutual relationship of a plurality of link mechanisms, in which drive can be achieved without applying an excessive load to each of parts of the link mechanisms, a delay in calculating time can be avoided to accomplish a high speed movement, and in which the capacity of the storage memory for the control may be small.

A control device for a link actuator according to the present invention will be described with the aid of reference numerals used in the accompanying drawings in connection with embodiments of the present invention. The control device 1 for the link actuator, according to the present invention, controls each of actuators of the link actuator in such a manner as to change position of a distal end side link hub 15 relative to a proximal end side link hub 14 from a starting point position A towards a terminating point position B which is commanded. The link actuator includes three or more link mechanisms 11 to 13 that connect the distal end side link hub 15 to the proximal end side link hub 14 in a position-changeable fashion, in which each link mechanisms 11 to 13 includes a proximal side end link member 11a to 13a, one end of the proximal side end link member 11a to 13a being pivotably connected to the proximal end side link hub 14; a distal side end link member 11b to 13b, one end of the distal side end link member 11b to 13b being pivotably connected to the distal end side link hub 15; and an intermediate link member 11c to 13c with its opposite ends pivotably connected to the other ends of the proximal side end link member 11a to 13a and the distal side end link member 11b to 13b, respectively, each of the link mechanisms 11 to 13 has such a shape that a geometric model of the link mechanism 11 to 13 represented by lines shows symmetry between a proximal end side portion thereof and a distal end side portion thereof with respect to a center portion of the intermediate link member 11c to 13c, and each link mechanisms 11 to 13 are provided with the actuator that arbitrarily changes position of the distal end side link hub 15 relative to the proximal end side link hub 14 by rotating the proximal side end link member in the form of the arm 11a to 13a.

This control device 1 referred to above includes a position change control unit 41 to drive each of the actuators in synchronism with each other on a point-to-point basis from a starting point, which is the rotational angle of the arm 11a to 13a when the starting point position A is assumed, to a terminating point which is the rotational angle when the terminating point position B is assumed;

a relay position setting unit 42 configured to compare a position changing amount of the distal end side link hub 15 in the position change from the starting point position to the terminating point position with a predetermined amount, and configured to, in the event that the position changing amount of the distal end side link hub 15 is larger than the predetermined amount, set one or more relay position according to a predetermined rule during the course of an position changing path for changing from the starting point position to the terminating point position and to set by determining a rotational angle which corresponds to a relay point of the rotational path of each of the arms 11a to 13a when the relay position is assumed. The position change control unit 41 performs a position control so that each of the arms simultaneously passes through the relay point set by the relay position change setting unit 42.

According to the construction of the present invention as described above, by the relay position setting unit 42, when the position change amount of the distal end side link hub 15 is greater than the predetermined amount, the relay position is set and the relay point in the rotational path of each of the arms 11a to 13a, at which the relay position is assumed, is set. The position change control unit performs the position control so that each of the arms 11a to 13a passes simultaneously across the relay point so set.

As described above, the relay position of the distal end side link hub 15 is set and the control is made to cause each of the arms 11a to 13a to pass simultaneously across the relay point at which the relay position thereof is assumed. For this reason, when the position of the distal end side link hub 15 changes considerably, without considerably departing from each of the arm rotational angles that are uniquely determined in dependence on the mutual relationship of the plurality of the link mechanisms 11 to 13, the position control of the actuator 3 of each of the arms 11a to 13a can be accomplished. Accordingly, drive can be accomplished without imposing an excessive load on various parts of the link mechanisms 11 to 13.

Also, although the calculation to determine the relay point is necessary, basically because of the point-to-point control, unlike the case in which the rotational angle is controlled so as to avoid the interference over the entire path of the position change of the distal end side link hub 15, the calculation time required for the control can be small, no delay from the calculation time occurs and the high speed movement can be achieved. Also, unlike the control taking place while the coordinates of the entire path has been stored, the capacity of the storage memory may be small.

It is to be noted that the position change amount and the predetermined amount referred to in the wording "(to) compare the position change amount of the distal end side link hub 15 with the predetermined amount" may be directly determined n dependence on the bending angle $\theta$ and the pivot angle $\phi$, they may be the bending angle $\theta$ or the pivot angle $\phi$, in which the maximum torque occurring in the actuator 3, when the point-to-point control is performed, or both of the bending angle $\theta$ and the pivot angle $\phi$.

In one embodiment of the present invention, the relay position setting unit 42 may divide the rotational amount of each of the arms 11a to 13a on the basis of a division number by which the position change amount of the distal end side link hub 15 from the starting point position to the terminating point position is divided into an amount smaller than a predetermined amount. The term "predetermined amount" referred to above may be the moving amount over which each of the actuators 3 for driving, for example, the distal end side link hub 15 can be driven under the point-to-point control at a value smaller than the predetermined value, and this is determined by the geometric dimensions of the link device and the initial preload applied to the link. Also, the predetermined value about the actuator 3 to be driven represent a value lower than the input torque permissible value of the link device. Where the link device includes a speed reducer in an input part thereof, it represents a value lower than the input torque permissible value of the speed reducer.

With the path for the position change so divided, the interference between arms 11a to 13a for each axis is relieved and the drive can be accomplished under an actuator torque proper enough to avoid an assembling inconvenience of the link and an abnormal frictional wear of the link. It is recommended that the movement path of the distal end side link hub 15 from the starting point position to the terminating point position be determined by approximation.

In one embodiment of the present invention, three link members may be provided and the relay position setting unit sets the relay point according to the rule, and the rule may include: selecting two arms out of the three arms 11a to 13a which operate during the course of changing the position from the starting point position of the distal end side link hub 15 to the terminating point position; equally dividing the rotational path of the selected two arms; and setting the position of the remaining one arm at a position uniquely determined according to a relative positional relationship with the other two arms.

In such case, as a criterion for selecting the two arms out of the three arms 11a to 13a, the arms having large rotational amounts may be selected. Since in this control the two arms, of which rotational amount is large, can move uniformly at the maximum speed of each axis, the movement can be achieved in the shortest movement time. Also, unless the rotational time is considered the selection of the two arms out of the three arms 11a to 13a may be arbitrarily chosen. It is, however, to be noted that the trajectory of the link distal end in this condition does not warrant the shortest path.

Particularly where the two arms are selected from the three arms 11a to 13a as hereinabove discussed, the position ($\theta$, $\phi$) of the distal end side link hub 15 may be determined from the rotational angle of the selected two arms by a transformation equation of forward transformation, and the rotational angle of the remaining one arm is determined by a transformation equation of inverse transformation from the position ($\theta$, $\phi$) of the link hub 15. By so doing, the rotational angle of the remaining one arm can be properly determined.

In such case, the position ($\theta$, $\phi$) of the distal end side link hub 15 may be determined by a convergence calculation with the use of the rotational angle of the two arms out of the three arms 11a to 13a and a transformation equation. By conducting the convergence calculation, the position ($\theta$, $\phi$) of the distal end side link hub 15 can be determined easily from the two rotational angles of the arm.

In one embodiment of the present invention, the relay position setting unit 42 utilizes the predetermined rule for determining the relay point of each of the arm, and in the rule one or more relay positions on a path through which the distal end side link hub 15 moves in the shortest distance and sets the rotational angle of each of the arms to be the relay point, the rotational angle corresponding to the position ($\theta$, $\phi$) of the distal end side link hub 15 on the path, which position is any one of the starting point position, the relay position and the terminating point position on the path and the value achieved between the neighboring positions attains a value smaller than a predetermined value. In this case, the rotational angle of each of the arms may be determined from the position ($\theta$, $\phi$) of the link hub 15 by means of the transformation equation of inverse transformation.

In other words, with respect to the certain starting point position (the bending angle, the pivot angle) A ($\theta$a, $\phi$a) and the certain terminating position B ($\theta$b, $\phi$b) of the distal end side link hub 15, the position changing path of the distal end side link hub 15 moving between the positions A and B is determined as small as possible. By performing a proper approximation if required, the time required to determine the path can be reduced. The path from the position A to the position B is divided into a plurality of positions, from the position N ($\theta$n, $\phi$n) of the distal end side link hub 15, the rotational angle N ($\beta$1n, $\beta$2n, $\beta$3n) of the arm axis relative to the position of the distal end side link hub 15 is obtained. The link position control is carried out so that the position of each of the axis can move simultaneously.

In one embodiment of the present invention, three link mechanisms may be provided, and, from the starting point position A ($\theta$a, $\phi$a) and the terminating point position B ($\theta$b, $\phi$b) of the distal end side link hub 15, the position ($\theta$1, $\theta$2, ... $\theta$n, $\phi$1, $\phi$2, ... $\phi$n) (wherein n is equal to the division number minus 1) of each of the distal end side link hubs 15, in which the moving amount $\Delta\theta$ of the bending angle $\theta$ and the moving amount $\Delta\phi$ of the pivot angle $\Delta\theta$ attains a value smaller than a predetermined moving amount, may be determined according to the transformation equation of inverse transformation and the position ($\theta$1, $\theta$2, ... $\theta$n, $\phi$1, $\phi$2, ... $\phi$n) of the distal end side link hub 15 so determined is set to be the relay position. By dividing the moving amount $\Delta\theta$ of the bending angle $\theta$ and the moving amount $\Delta\phi$ of the pivot angle $\phi$ into the value smaller than the predetermined amount, the drive can be accomplished with the interference having been further reduced and without an excessive load.

In one embodiment of the present invention, the position change control unit 41 may perform a positional control from the starting point position A of the distal end side link hub 15 to the terminating point position B thereof without acceleration and deceleration over the entire zone except for an acceleration zone, in which the position change starts from the starting position, and a deceleration zone in which deceleration takes place immediately before the terminating point position is attained.

According to one embodiment of the present invention, the link actuator may be of such a design that assuming that in the link actuator a connecting end axis of the intermediate link member, which is pivotably connected with the proximal side end link member, and a connecting end axis of the intermediate link member, which is pivotably connected with the distal side end link member cooperate with each other to form an angle γ therebetween, and connecting end axes of the intermediate link member, which are pivotably connected with the proximal end side and distal side end link members, and connecting end axes of the proximal end side link hub and the distal end side link hub, which are pivotably connected with the proximal end side link member and the distal end side link member, respectively, cooperate with each other to form angles α therebetween, respectively, and; that a rotational angle of the proximal side end link member relative to the proximal end side link hub is expressed by $\beta n$ (n=1, 2, 3, . . . ); a circumferential separating angle of each of the proximal side end link members relative to the proximal side end link member forming a reference is expressed by $\delta n$ (n=1, 2, 3, . . . ); a vertical angle at which the center axis of the distal end side link hub is inclined relative to the center axis of the proximal end side link hub is expressed by $\theta$; a horizontal angle at which the center axis of the distal end side link hub is inclined relative to the center axis of the proximal end side link hub is expressed by $\phi$, and also assuming that, where on a circumference through which a revolute pair portion of the proximal side end link member and the intermediate link member passes, a circumference separating angle of each of a revolute pair portions relative to a phase forming a reference is expressed by $\epsilon n$ (n=1, 2, 3, . . . ) and a separating angle of the revolute pair portion of the proximal side end link member and the intermediate link member during a condition in which the position of the distal end side link hub relative to the proximal end side link hub is held in the position of origin ($\theta$=0, $\phi$=0) forming a reference is expressed by $\epsilon 0$;

each of the actuators is controlled to determine the rotational angle $\beta n$ of the proximal side end link member from the position ($\theta$, $\phi$) of the distal end side link hub relative to the proximal end side link hub forming a target and then to set the determined rotational angle $\beta n$ to be a desired rotational angle by means of the inverse transformation of the following equation 1 so that the relationship expressed by the following relational equations is satisfied:

$$\begin{pmatrix} \cos(\gamma/2)\cos\varepsilon 0 \\ \pm\sin\alpha\cos\beta n \\ \sin\alpha\sin\beta n \end{pmatrix} = \quad \text{Equation 1}$$

$$\begin{pmatrix} \cos(\phi-\delta n) & -\sin(\phi-\delta n) & 0 \\ \sin(\phi-\delta n) & \cos(\phi-\delta n) & 0 \\ 0 & 0 & 1 \end{pmatrix} \begin{pmatrix} \cos(\theta/2) & 0 & \sin(\theta/2) \\ 0 & 1 & 0 \\ -\sin(\theta/2) & 0 & \cos(\theta/2) \end{pmatrix}$$

$$\begin{pmatrix} \cos(\phi-\delta n) & \sin(\phi-\delta n) & 0 \\ -\sin(\phi-\delta n) & \cos(\phi-\delta n) & 0 \\ 0 & 0 & 1 \end{pmatrix} \begin{pmatrix} \cos(\gamma/2)\cos\varepsilon n \\ \cos(\gamma/2)\sin\varepsilon n \\ \sin(\gamma/2) \end{pmatrix}$$

-continued $$\varepsilon_0 = \pm\sin^{-1}\left(\sqrt{\frac{\sin^2\alpha - \sin^2(\gamma/2)}{\cos^2(\gamma/2)}}\right). \quad \text{Equation 2}$$

The applicant of the present invention has suggested, in the patent document 4 listed above, a control method for the link actuator. The suggested control method is defined by four functions including the rotational angle $\beta n$ of the end link member, the angle γ formed between the connecting end axis of the intermediate link member, which is pivotably connected with the proximal side end link member, and the connecting end axis of the intermediate link member connected pivotably with the distal side end link member, the circumferential separating angle $\delta n$ of each of the proximal side end link member relative to the proximal side end link member forming the reference, the vertical angle $\theta$ at which the center axis of the distal end side link hub is inclined relative to the center axis of the proximal end side link hub, and the horizontal angle $\phi$ at which the center axis of the distal end side link hub is inclined relative to the center axis of the proximal end side link hub.

It has, however, been found that since the function of the angle (axis angle of the end link member) α formed between the connecting end axis of the intermediate link member, which is pivotably connected with the end link member, and the connecting end axis of the link hub connected pivotably with the end link member, which is a parameter required to construct the link actuator, is not included, and is hence limited to the case in which the axis angle α of the end link member is 90 degrees. Accordingly, the suggested control method is unable to control any other link actuator than the link actuator in which the axis angle α of the end link member is 90 degrees.

According to the foregoing construction, once the position ($\theta$, $\phi$) of the distal end side link hub, which is targeted, is determined, inverse transformation of the equation 1 makes it possible to determine the rotational angle $\beta n$ of the end link member. When each of the actuators is controlled so that the rotational angle $\beta n$ so determined can be attained, the position ($\theta$, $\phi$) of the distal end side link hub relative to the proximal end side link hub can assume the position so targeted. Since the function of the axial angle α of the end link member is included in the equation 1, when the value of α in the equation 1 is rendered to be the axis angle α of the end link member of each of the link actuators, the operation can be controlled even in the link actuator in which the axis angle α of the end link member is other than 90 degrees.

In one embodiment of the present invention, the use may be made of a position calculating device operable to calculate the position ($\theta$, $\phi$) of the distal end side link hub relative to the current proximal end side link hub from the rotational angle $\beta n$ of the proximal side end link member by forward-transforming the following equation 1:

According to the above described construction, by means of the position calculating device, the position ($\theta$, $\phi$) of the distal end side link hub relative to the current proximal end side link hub can be calculated by inserting into and forward-transforming the rotational angle $\beta n$ of the current proximal side end link member. Since in the equation 1 the function of the axis angle α of the end link member is included, by rendering the value of α in the equation 1 to be the axis angle α of the end link member of each of the link actuator, the position (θ, φ) of the distal end side link hub relative to the proximal end side link hub can be calculated even in the link actuator.

According to one embodiment of the present invention, the positive or negative on the second line in the left side of the equation 1 and the positive or negative on the right side of the equation 1 may be determined depending on the direction of assembly of the proximal end side end link relative to the proximal end side link hub. The separating angle ε0 involves two solutions that are different in dependence on the direction of assembly of the distal side end link member relative to the proximal end side link hub. Accordingly, the positive or negative on the second line in the left side of Table 1 and the positive or negative in the right side of the equation 2 are fixed depending on the direction of assembly of the proximal end side link relative to the proximal end side link hub. By way of example, when the direction of assembly is in the rightward direction, it is "+" whereas when the direction of assembly is in the leftward direction, it is "−" and, by so doing, the equation 1 establishes. Accordingly, the operation can be controlled and the position (θ, φ) of the distal end side link hub relative to the proximal end side link hub can be calculated.

In a yet further embodiment of the present invention, the axis angle α of the end link member may be 90 degrees. When the axis angle α of the end link member is 90 degrees and the connecting end axis of the intermediate link member, which is pivotably connected with the proximal end side and distal side end link members, and the connecting end axis of the proximal end side and distal end side link member, which is connected pivotably with the proximal end side and distal side end link members, lie perpendicular to each other, the processability such as perforating process of the end link member becomes good and the mass-productivity is excellent.

Alternatively, the axis angle α of the end link member is not greater than 90 degrees. If the axis angle α of the end link member is chosen to be not greater than 90 degrees, although in terms of a mechanism the operating range of the link actuator may become small, the structure is such that the interference between the link mechanism will hardly occur. Also, reduction in weight of the end link member and downsizing can be accomplished, and the end link member can be manufactured at a low cost in terms of, for example, the material cost of the end link member. In view of this, the reduction in weight of the link actuator in its entirety and downsizing can be accomplished. Also, the interior space of the link actuator expands and the structure will be obtained in which cables and any other component parts can be disposed within the interior space.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. Also, in the drawings attached hereto, like reference numerals used to denote corresponding component parts in the accompanying drawings stands for like or corresponding component parts. In the accompanying drawings, like reference numerals are used to denote like parts throughout the several views, and:

DESCRIPTION OF EMBODIMENTS

Figure 1:
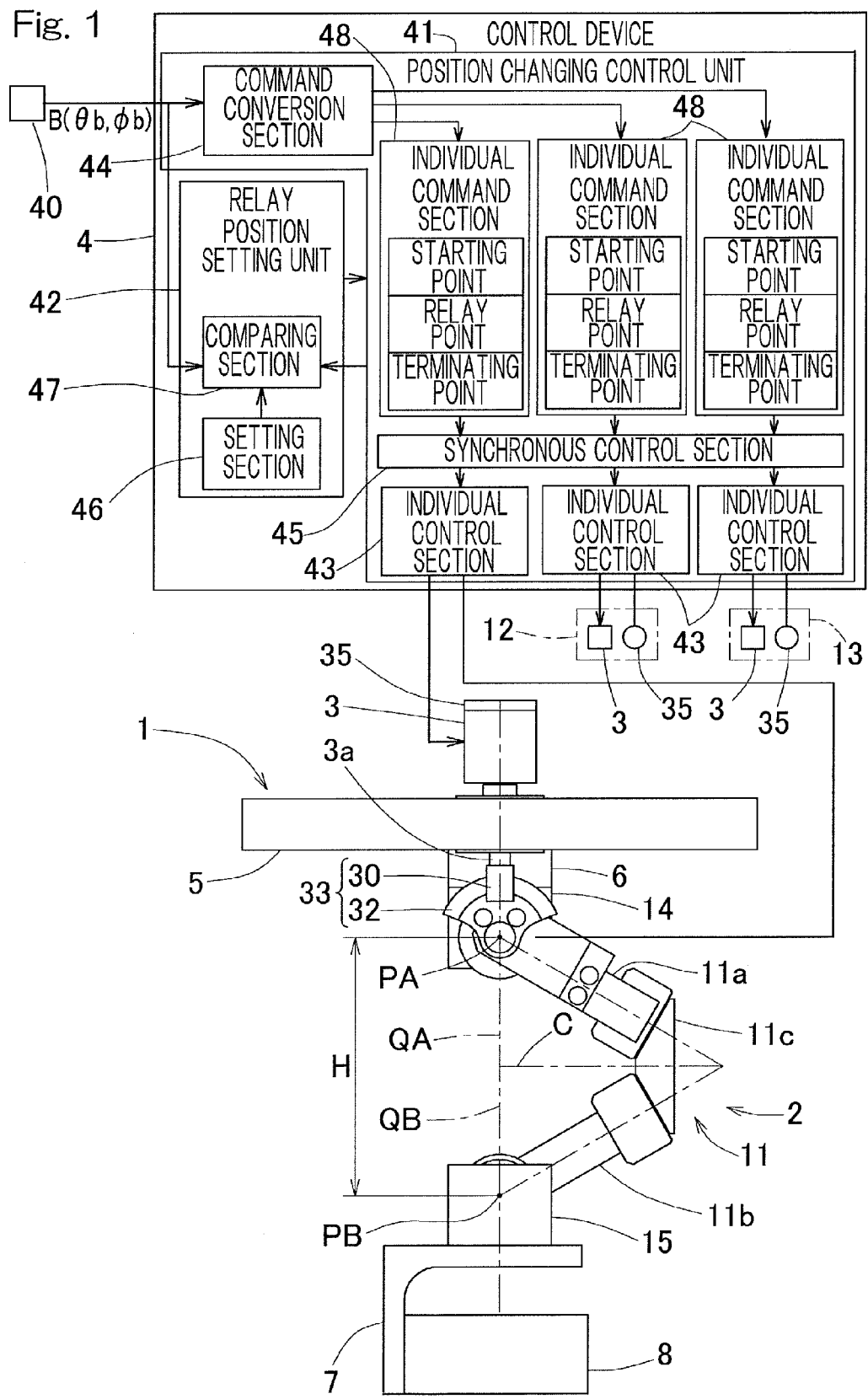
FIG. 1 is an explanatory diagram of a first embodiment of the present invention, which shows, in combination, a block diagram of a control device for a link actuator and a fragmentary front elevational view of a portion of the link actuator, which forms a target to be controlled.
Figure 2:
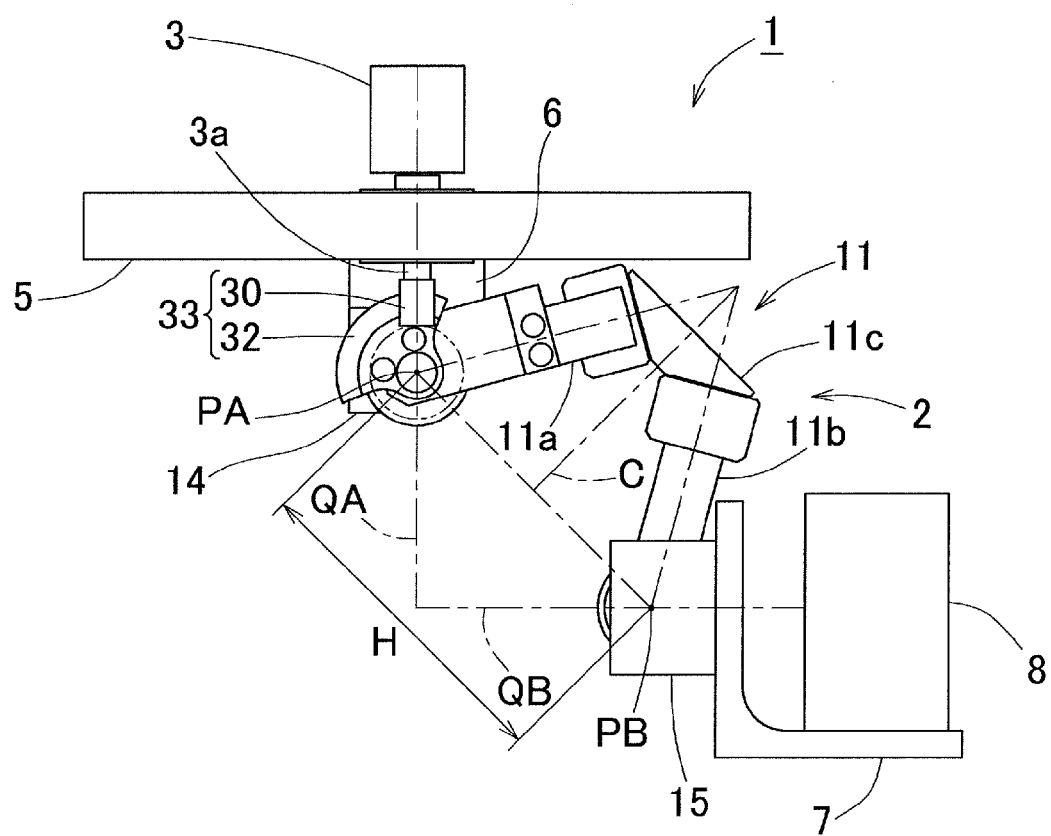
FIG. 2 is a front elevational view, with a portion removed, of the link actuator, showing the operation thereof that is different from that of the link actuator shown in FIG. 1.

Hereinafter, embodiments of the present invention will be described in detail with particular reference to the accompanying drawings. At the outset, a link actuator which forms a target to be controlled will described with particular reference to FIGS. 1 to 5. As shown in FIGS. 1 and 2, this link actuator 1 includes a link actuator main body 2 and a plurality of position control actuators 3 for actuating the link actuator main body 2 and those position control actuators 3 are controlled by a control device 4. In the example as shown, the link actuator main body 2 is disposed suspended from a support member 5 via a spacer 6 on a proximal end side of such link actuator main body 2. The link actuator main body 2 has a distal end side on which an end effector 8 is mounted through a distal end mounting member 7.

Figure 3:
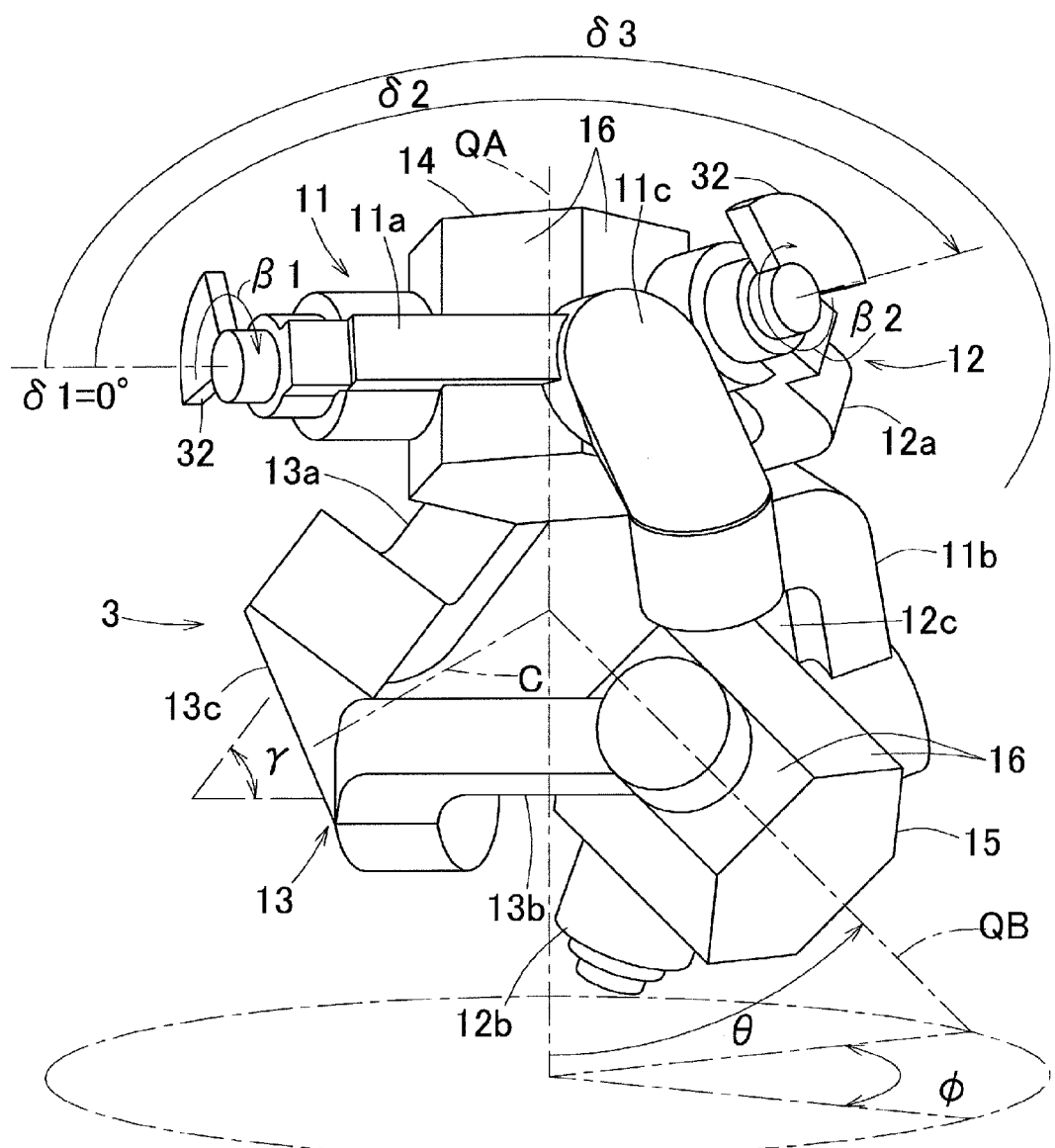
FIG. 3 is a perspective view showing a link actuator main body of the link actuator.
Figure 22:
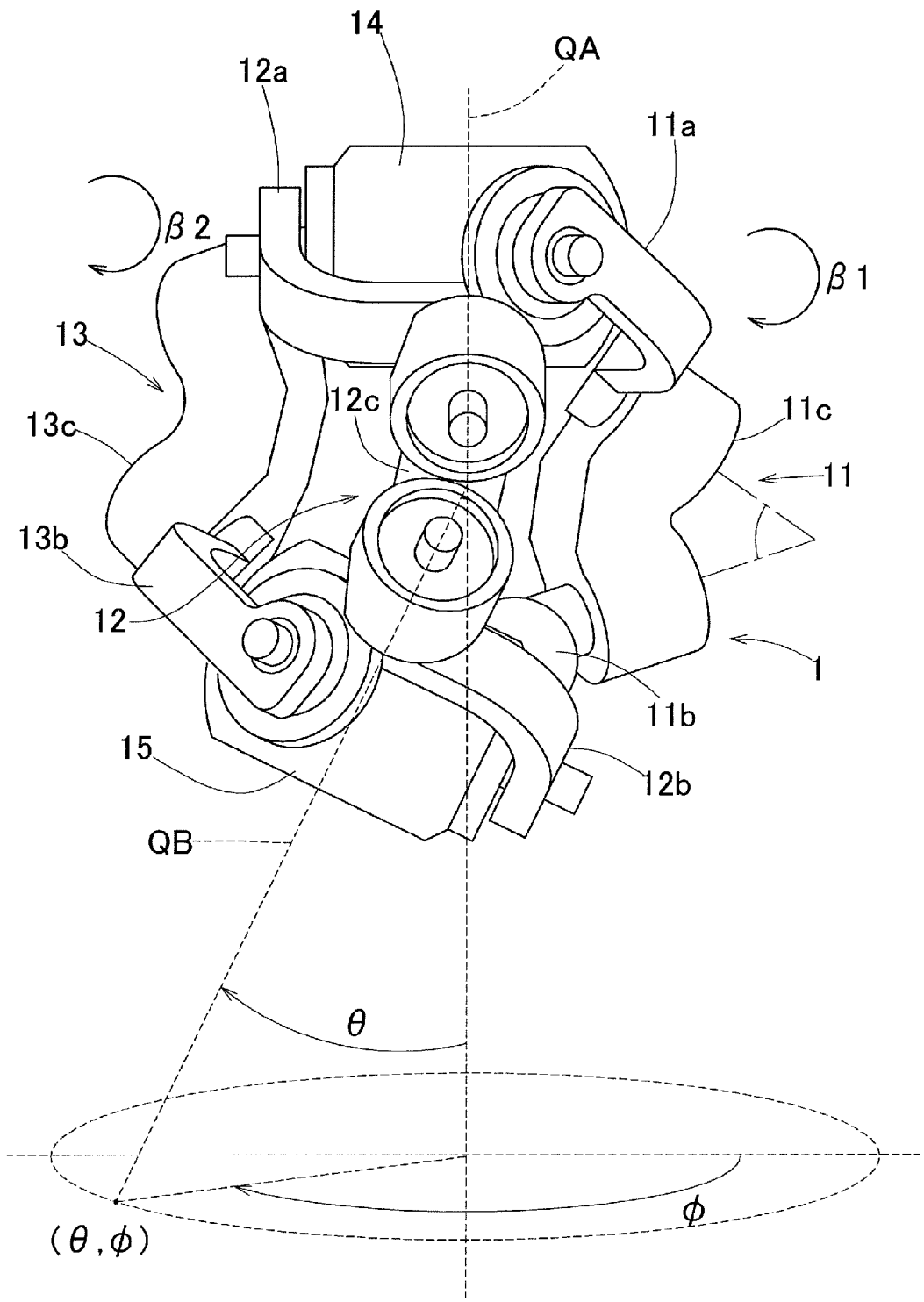
FIG. 22 is a perspective view showing one example of the conventional link actuator in which three or more link mechanism in trinodal crank chain are employed.
Figure 23:
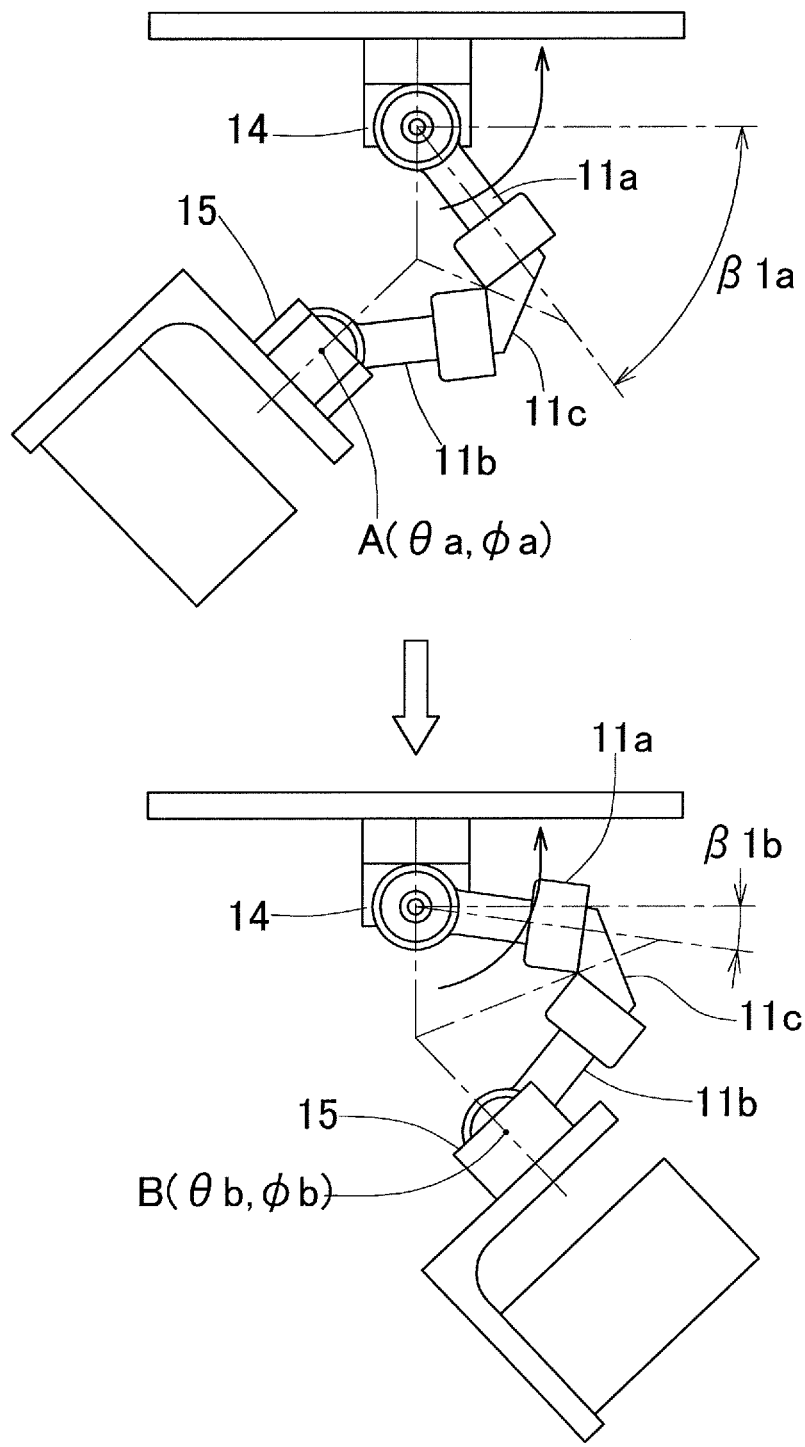
FIG. 23 is an explanatory diagram showing the position changing operation of the link actuator.
Figure 24:
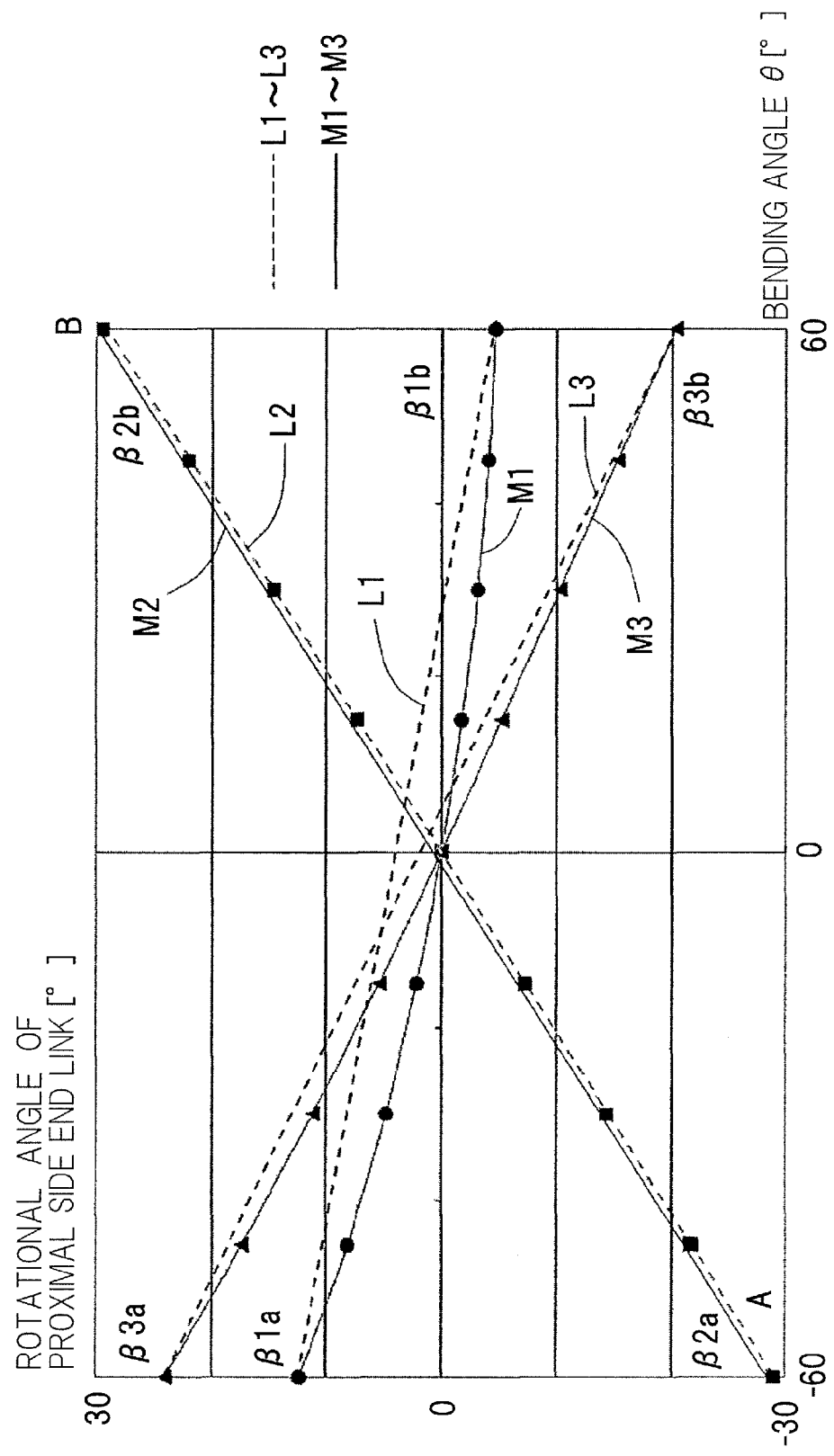
FIG. 24 is a diagram showing the relationship between the bending angle and the angle of rotation of the proximal end side end link that are exhibited when the position change is performed by the link actuator.

The link actuator main body 2 is of a construction basically identical with the link actuator shown in FIG. 22 and previously discussed with reference thereto. As shown in FIG. 3, the link actuator main body 2 is equipped with three link mechanisms 11, 12 and 13 (hereinafter, designated as "11 to 13"). It is to be noted that in FIGS. 1 and 2, only one link mechanism is shown regarding the shape of the link mechanism 11 and in FIG. 1, with respect to the remaining two link mechanisms 12 and 13, they are shown in a block diagram only for the purpose of description. Those three link mechanisms 11 to 13 are of the same geometric shape. In other words, each of the link mechanisms 11 to 13 is of such a design that the geometric model, in which each of link members 11a to 13a, 11b to 13b and 11c to 13c as will be described later is depicted by line is such that a proximal end side portion and a distal end side portion are of a symmetrical shape with respect to an intermediate portion of intermediate link members 11c to 13c.

Each of the link mechanisms 11, 12 and 13 is comprised of a proximal side end link member 11a, 12a, 13a (hereinafter, designated by "11a to 13a"), a distal side end link member 11b, 12b, 13b (hereinafter, designated by "11b to 13b") and an intermediate link member 11c, 12c, 13c (hereinafter, designated by "11c to 13 c") and forms a trinodal structure link mechanism made up of four revolute pairs.

Each of the proximal end side link members 11a to 13a and the distal side end link members 11b to 13b has a shape similar to that of the figure "L" and also has a proximal end pivotably connected with a proximal end side link hub 14 and a distal end side link hub 15. Each of the intermediate link members 11c to 13c is pivotably connected at its opposite ends with respective distal ends of the proximal end side link members 11a to 13a and the distal side end link members 11b to 13b. It is to be noted that the end link members 11a to 13a are "arms" of the link actuator 1 and, therefore, in the description that follows, they may occasionally referred to as "arms 11a to 13a".

Each of the proximal end side link hub 14 and the distal end side link hub 16 has a hexagonal columnar shape and, the proximal end side and distal side end link members 11a to 13a and 11b to 13b are pivotably connected respectively with three side faces 16 of the six side faces 16 forming an outer surface thereof, which are alternately spaced from each other.

The proximal side end link members 11a to 13a and the distal side end link members 11b to 13b of each of the three link mechanisms 11 to 13 is of a structure referred to as a spherical link mechanism. In other words, respective spherical link centers PA (shown in FIGS. 1 and 2) of the proximal side end link members 11a to 13a are matched with each other and respective spherical link centers PB (also shown in FIGS. 1 and 2) of the distal side end link members 11b to 13b are matched with each other. Also, the distances from the spherical link centers PA to the proximal side end link members 11a to 13a remain the same and, also, the distances from the spherical link centers PB to the distal side end link members 11b to 13b remain the same. The respective revolute pairs that form joints between the proximal end side and distal side end link members 11a to 13a and 11b to 13b and the intermediate link members 11c to 13c may have a certain crossed axes angle or, alternatively, may be parallel to each other.

Figure 4:
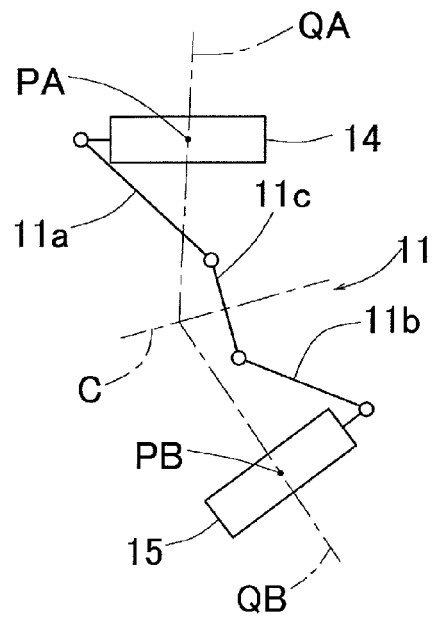
FIG. 4 is a diagram showing a geometric model of a link mechanism of the link actuator depicted in one line.

In other words, the three link mechanisms 11 to 13 have respective geometric shapes that are identical with each other. The geometricly identical shape so discussed means that the geometric model of each of the link members 11a to 13a, 11b to 13b, 11c to 13c that are drawn by lines, that is, each of the revolute pairs and the model drawn by line so as to connect between those revolute pairs is such that a proximal end side portion and a distal end side portion with respect to an intermediate portion of the intermediate link members 11c to 13c represents a symmetrical shape. FIG. 4 is a diagram showing one of the link mechanisms 11 depicted by line.

The link mechanisms 11 to 13 employed in the practice of this embodiment is of a rotation symmetrical type and, hence, the positional relationships between the proximal end side link hub 14 and the proximal side end link members 11a to 13a and the distal end side link hub 15 and the distal side end link members 11b to 13b are so designed as to assume a rotation symmetry with respect to a center line C of the intermediate link members 11c to 13c. FIG. 1 illustrates a condition in which a center line QA of the proximal end side link hub 14 and a center axis QB of the distal end side link hub 15 lie on the same line, and FIG. 2 illustrates a condition in which the center axis QB of the distal end side link hub 15 relative to the center axis QA of the proximal end side link hub 14 assumes a predetermined operating angle. Even when the position of each of the link mechanisms 11 to 13 changes, the distance H between the proximal end side and distal end side spherical link centers PA and PB does not change.

Figure 5:
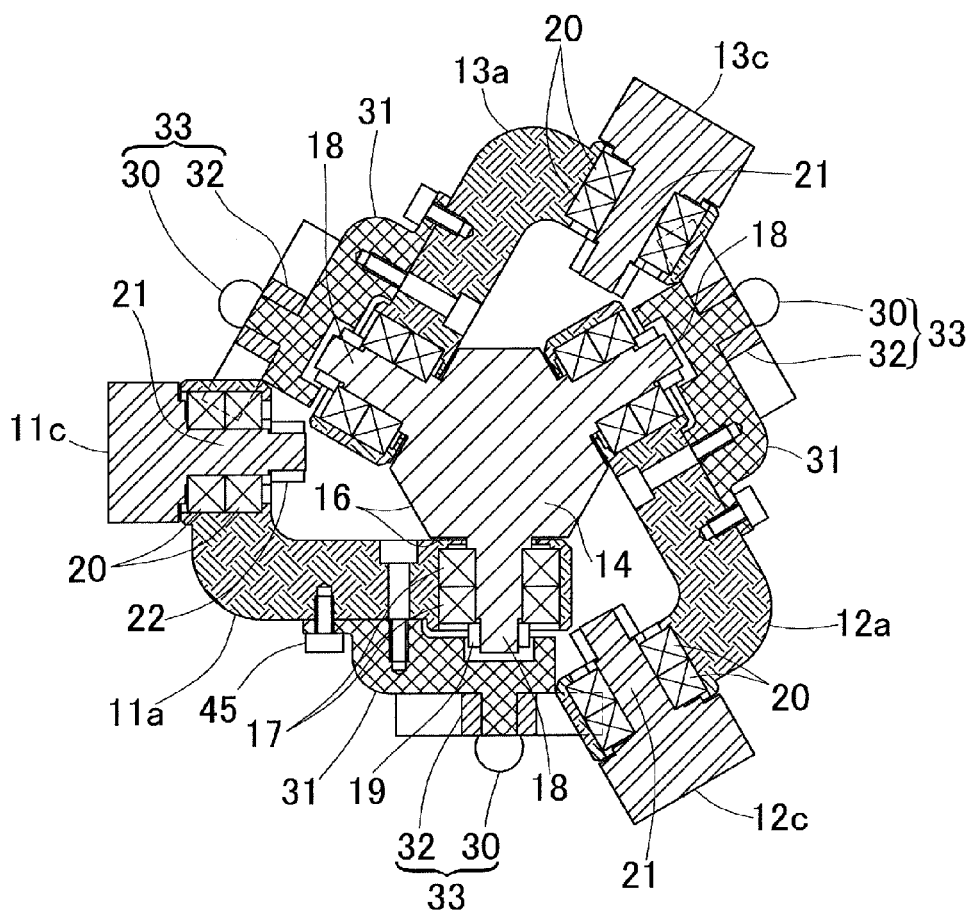
FIG. 5 is a sectional view showing a proximal end side link hub, a proximal side end link member and an intermediate link member of the link actuator.
Figure 6:
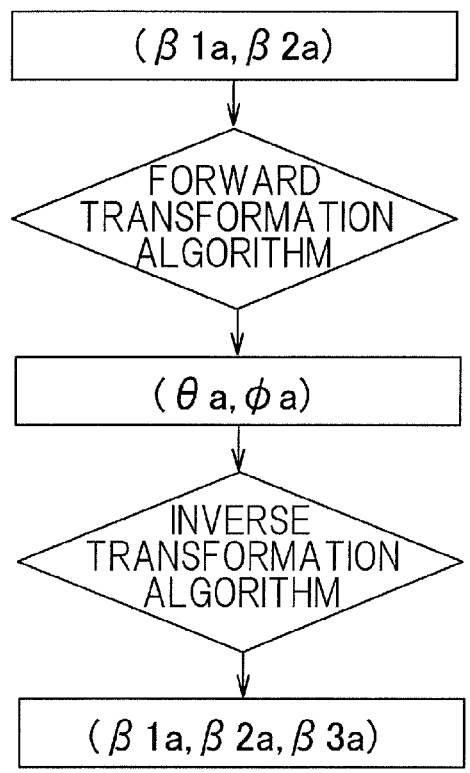
FIG. 6 is a flowchart showing the sequence of transformation of the coordinate system in the control device for the link actuator.

FIG. 5 illustrates a sectional view of the joints between the proximal end side link hub 14 and the proximal side end link members 11a to 13a. Shaft portions 18 protrude outwardly from respective side faces 16 of the proximal end side link hub 14, respective inner rings (not shown) of double-row bearings 17 are mounted externally on the shaft portions 18, and respective outer rings (not shown) of the double-row bearings 17 are mounted internally on shaft portions on proximal end side link hub side of the proximal side end link members 11a to 13a. In other words, the structure is such that the inner rings are fixed to the proximal end side link hub 14 and the outer rings are rotatable together with the respective proximal side end link members 11a to 13a.

Each of the bearings 17 is in the form of a ball bearing such as, for example, a deep groove ball bearing or an angular contact ball bearing and is fixed by fastening a corresponding nut 19 while having been applied a predetermined preload amount. For the bearing 17, other than the ball bearing arranged in a number of row as is the case as shown, a roller bearing or a slide bearing may be employed. The joints between the distal end side link hub 15 and the distal side end link members 11b to 13b are similar in structure to that previously described.

Also, the joints between the proximal side end link members 11a to 13a and the intermediate link members 11c to 13c are also connected pivotably with each other through respective double-row bearings 20. In other words, respective outer rings (not shown) of the bearings 20 are mounted externally on the proximal side end link members 11a to 13a, and respective inner rings (not shown) of the bearings are mounted externally on shaft portions 21 provided in the corresponding intermediate link members 11c to 13c. Each of the bearings 20 is a ball bearing such as, for example, a deep groove ball bearing or an angular contact ball bearing and is fixed by fastening a nut 22 while having been applied a predetermined preload amount. For the bearing 20, other than the ball bearing arranged in a number of row as is the case as shown, a roller bearing or a slide bearing may be employed. The joints between the distal side end link members 11b to 13b and the intermediate link members 11c to 13c are also similar in structure to that previously described.

In the previously described link mechanisms 11 to 13, the angles and length of the shaft portions 18 of the proximal end side and distal side end link members 11a to 13a and 11b to 13b are equal to each other and, also, respective geometric shapes of those end link members 11a to 13a and 11b to 13b are equal on the proximal end side and the distal end side. Yet, even in the intermediate link members 11c to 13c, the shapes on the proximal end side and the leading side are equal to each other.

In this condition, the respective angle positional relationships between the intermediate link members 11c to 13c relative to the plane of symmetry of the intermediate link members 11c to 13c and the proximal side end link members 11a to 13a and the distal side end link members 11b to 13b that are connected respectively with the proximal end side link hub 14 and the distal end side link hub 15 are chosen to be the same as between the proximal end side and the distal end side. By so doing, it will readily be seen that in view of the geometric symmetry, the proximal end side link hub 14 and the proximal side end link members 11a to 13a and the distal end side link hub 15 and the distal end side end kink members 11b to 13b will move in the same manner and rotate at a constant velocity with the same angle of rotation on the proximal end side and the distal end side. The plane of symmetry of the intermediate link members 11c to 13c at the time of constant velocity rotation is referred to as a constant velocity bisector plane.

For this reason, by disposing a plurality of the link mechanisms 11 to 13 of the same geometric shapes, which commonly share the proximal end side link hub 14 and the distal end side link hub 15, on the circumference, the intermediate link members 11c to 13 c are limited only to the movement in the constant velocity bisector plane as position where the plurality of the link mechanisms 11 to 13 can be moved without contradiction. Accordingly, the constant velocity rotation can be obtained even though the proximal end side and the distal end side assume any arbitrary operating angle.

Each of the link mechanisms 11 to 13 includes four rotation portions of the revolute pairs. More specifically, they includes a connection part between the proximal end side link hub 14 and the proximal side end link members 11a to 13a; a connection part between the distal end side link hub 15 and the distal side end link members 11b to 13b; and two connection parts between proximal end side and distal side end link members 11a to 13a and 11b to 13b and the intermediate link members 11c to 13c. By rendering those rotation portions of the four revolute pairs to be bearing structures, the rotational resistance can be relieved while the frictional resistances at those connection parts are reduced, a smooth power transmission can be secured and the durability can be increased.

According to this construction of the link actuator main body 2, a large movable range of the distal end side link bub 15 relative to the proximal end side link hub 14 can be secured. More specifically, by way of example, the to maximum value of the bending angle θ (the maximum bending angle) between the center axis QA of the proximal end side link hub 14 and the center axis QB of the distal end side link hub 15 can be set to about ±90 degree. Also, the angle φ of pivot of the distal end side link hub 15 relative to the proximal end side link hub 14 can be set to a vale within the range of 0 to 360 degree.

Referring to FIGS. 1 and 2, the plurality of the actuators 3 are disposed on the support member and are circumferentially spaced an equal distance from each other. The number of the actuators 3 is three that is equal to the number of the link mechanisms 11, 12 and 13. In the embodiment now under discussion, the actuator 3 is in the form of a motor and a pinion 30 is provided on an output shaft 3a thereof. On the other hand, a connecting member 31, shown in FIG. 5, is fixedly fitted to the revolute pair with the shaft portion 18 in the proximal side end link members 11a to 13a, and a sector gear 32 capable of being meshed with the pinion 30 is provided in this connecting member 31. A center axis of the sector gear 32 is matched with the center axis of the shaft portion 18 shown in FIG. 5. The pinion 30 and the sector gear 32 cooperate with each other to define a speed reducing mechanism 33.

When each of the actuators 3 is rotationally driven, the rotation thereof is transmitted to the shaft portion 18, shown in FIG. 5, through the speed reducing mechanism 33 and the angle of the arms 11a to 13a, which is the proximal side end link member, relative to the proximal end side link hub 14, is accordingly changed. Therefore, the position of the distal end side link hub 15 relative to the proximal end side link hub 14 is fixed. This position is defined by the bending angle θ, shown in FIG. 3, and the angle φ of pivot shown in FIG. 3. Respective angles β1, β2 and β3 of the arms 11a to 13a can be estimated from values detected by a rotational angle detecting unit 35 and the value of reduction gear ratio of the speed reducing mechanism 33.

In the description that follows, the control device 4 will be discussed with particular reference to FIG. 1. The control device 4 is a device for controlling each of the actuator 3 so that the position of the distal end side link hub 15 relative to the proximal end side link hub 14 can be changed from the start position, which is the current position, to the terminating position which is given from an external commanding unit 40 to the control device 4. This control device 4 is of a type numerically controlled by a computer and is mainly made up of a position change control unit 41 for performing a basic control and a relay position setting unit 42 relating to a characteristic control.

The position change control unit 41 drives each of the actuators 3 on a point-to-point basis from the starting point, which represents the angle of rotation of the arms 11a to 13a when the starting point position is assumed, to the terminating point, which is represented by the angle of rotation when the terminating point position is assumed. This position change control unit 41 has a function of performing such a synchronous control so that the actuators 3 can start moving simultaneously form the starting point and can arrive at the terminating point simultaneously, and they can pass a relay point simultaneously.

The position change control unit 41 referred to above is made up of a plurality of individual control sections 43 for controlling the respective actuators 3 for the link mechanisms 11 to 13, a command conversion section 44, a synchronous control section 45 and individual command sections 48.

Each of the individual control sections 43 performs a position control on a point-to-point basis from a given starting point to the terminating point and is, for example, operable to perform a trapezoidal speed control of acceleration, constant speed movement and deceleration. The velocity for the constant speed movement for this trapezoidal speed control and the accelerated velocity during acceleration and deceleration are given by the synchronous control section 45. The individual control section 43 is, more specifically, made up of an operating amount converting part (not shown) for converting, for example, the arm rotation angle into an actuator movement amount, an operation command generating part (not shown) and a servo controller part (not shown). The operation command generating part referred to above applied an operation command to the servo controller part by means of a pulse sweep according to a velocity curve of the trapezoidal speed control, and the servo controller part performs a feedback control with the use of the operation command, which has been so given, and a detection value of the rotational angle detecting unit 35.

The command conversion section 44 converts a command B (θb, φb) of the terminating position, which is determined by the bending angle θ and the pivot angle α from the commanding unit 40, into the rotational angle β of the arm 11a to 13a of each of the link mechanisms 11 to 13 and the converted rotational angle β comes to represent the corresponding arm rotational angle. The command conversion section 44 referred to above applies the converted rotational angle β of each of the arms 11a to 13a to the associated individual command section 48 as the position of the terminating point. Calculation to determine the rotational angle β of each of the arms 11a to 13a from the bending angle θ and the pivot angle φ is accomplished by means of the inverse transformation according to the relational equation (1) as will be described later.

The starting position refers to the current position and the starting point given to each of the individual command section 48 refers to the current position of each of the arms 11a to 13a. This starting point is the terminating point during the previous cycle of movement and the current position estimated from the value, which is detected by each of the rotational angle detecting units 35, and the reduction gear ratio of the speed reducing mechanism 33 or a predetermined reference position and others.

The synchronous control section 45 performs a synchronous control by setting the velocity at the time of the constant speed movement of the trapezoidal velocity control in each of the individual control sections 43 and the accelerated velocity (or the acceleration and deceleration time constant) during acceleration and deceleration so that each of the arms 11a to 13a starts rotation synchronously from the starting point and can terminate synchronously at the terminating point. Instead of the velocity, the terminating time of the acceleration and the starting time of the deceleration may be determined. The synchronous control section 45 referred to above also determines the velocity curve referred to above, so that a position and/or velocity control, in which the arms 11a to 13a can pass synchronously through the relay point referred to previously.

The relay position setting unit 42 referred to previously sets one or more relay positions according to a predetermined rule during the process of changing an position changing path when such position changing amount of the distal end side link hub 15, when the distal end side link hub 15 changes its position from the starting point position to the terminating point position, is found to be greater than a predetermined amount as a result such position changing amount of the distal end side link hub 15 has been compared by a comparing section 47 with the predetermined amount in a setting section 46. This relay position setting unit 42 sets by determining the rotational angle, which will become a relay point of the rotating path of each of the arms 11a to 13a when the relay position is established. It is to be noted that the path for the position change of the distal end side link hub 15 is rendered to be, for example the path of a center of the link hub 15. Also, the distal end side link hub 15 can have its position changeable on an arbitrary path, but the relay position assumes the relay position when passing along the position change path that is, for example, the shortest path.

In the example under discussion, the relay position setting unit 42 divides the rotational amount of each of the arms 11a to 13a based on the division number by which the position changing amount from the starting point position to the terminating point position of the distal end side link hub 15 have been divided into a value smaller than a predetermined value. The "predetermined rule" may include, for example, selecting two arms from the three arms 11a to 13a which operate during the course of changing the position from the starting point position to the terminating point position, and equally dividing the rotating paths of those selected two arms, and positioning the remaining arm to a position that is uniquely determined from the relative positional relationship with the two arms referred to previously. As the criterion with which the two arms are selected out of the three arms 11a to 13a, the arm which shows the large rotational amount is preferably selected.

The synchronous control section 45 causes each of the individual control sections 43 to fix the velocity curve, referred to previously, so that each of the arms 11a to 13a can pass simultaneously through the relay point of each of the arms 11a to 13a that is determined by the relay position setting unit 42 as hereinabove described. Each of the individual control sections 43 controls the actuator 3 of the associated arms 11a to 13a according to the velocity curve so determined. Accordingly, the position change control unit 41 initiates the simultaneous movement of the actuators 3 from the starting point, causes them to arrive at the terminating point simultaneously and performs a synchronous control so that they can pass the relay point simultaneously.

The operation of the above described construction will now be described. The link actuator 1 that will become a target to be controlled is of such a design that the bending angle θ and the pivot angle φ and the rotational angle βn (β1, β2, β3) of each of the proximal end side end links 11a, 12a and 13a are in such relationship as expressed by the following equation (A):

$$\cos(\theta/2)\cdot\sin\beta n - \sin(\theta/2)\cdot\sin(\phi+\delta n)\cdot\cos\beta n + \sin(\gamma/2) = 0 \quad (A)$$

In the equation (A) above, the parameter γ represents the angle defined between a connecting end axis of the intermediate link members 11c, 12c and 13c that are pivotably connected with the arms 11a, 12a and 13a, and a connecting end axis of the intermediate link members 11c, 12c and 13c that are pivotably connected with the distal side end link members 11b, 12b and 13b. The parameter δn (δ1, δ2, δ3) referred to above represents the separating angle defined by each of the proximal side end link members 11a, 12a and 13a in the circumferential direction relative to the arm 11a that forms a reference. Where the number of the link mechanisms 11, 12 and 13 is three sets and each of the link mechanisms 11, 12 and 13 are circumferentially equidistantly spaced, the separating angles δ1, δ2 and δ3 of each of the arms 11a, 12a and 13a will be 0 degree, 120 degrees and 240 degrees, respectively.

From the foregoing relationship, regarding a certain starting point position (the bending angle and the pivot angle) A (θa, φa) and a certain terminating point position B (θb, φb) of the distal end side link hub 15, the arm rotational angle corresponding to those positions A and B establish the relationship as respective rotational angle A1 (β1a, β2a, β3a) and rotational angle B1 (β1b, β2b, β3b) from the foregoing relational equation (A) between the proximal end side link hub 14 and the distal end side link hub 15 and the arm rotational angle.

In this condition, the relay position setting unit 42 determines the amount of movement of the distal end side link hub 15 from the starting point position A to the terminating point position B and, in the event that the amount of movement so determined is larger than a predetermined amount of movement, divides the interval from the starting position A to the terminating point position B into a plurality of positions so that the amount of movement so determined may become smaller than the predetermined amount of movement. The term "predetermined amount of movement" referred to above is to be understood as meaning the amount of movement in which the motor torque of each of the actuators 3 comprised of motors can be driven at the value smaller than a predetermined value. This amount of movement referred to above is determined by the geometric dimensions of the link actuator 1 and the initial preload applied to the link. Also, the predetermined value in connection with the motor torque to be driven represents a value smaller than an input torque permissible value of, for example, the previously described speed reducing mechanism 33 which forms an input part of the link actuator 1.

By dividing the path at the time of the position change in the manner described above and controlling the relay point, which is a dividing part thereof, so that the arms 11a to 11c of each axis can pass simultaneously, interference between the arms 11a to 11c of each axis is relieved and they can be driven at a proper motor torque without any assembling inconvenience of the links and abnormal friction or the like being applied. The term "interference" referred to above means the occurrence of the arm rotational angle that results in a deviation relative to the command value to the actuator 3 as hereinbefore described. The path of movement of the distal end side link hub 15 from the starting point position A to the terminating position B is determined by approximation.

Also, calculation to determine the relay point is necessary, but basically because of the point-to-point control, unlike the control of the rotational angle so that no interference occur over the entire path of the position change of the distal end side link hub 15, the length of time to accomplish the calculation necessitated for the control can be reduced and a high speed movement can be accomplished with no delay brought about by the calculating time. Also, unlike the control that is accomplished by allowing coordinates of the entire path to be stored, the capacity of a storage memory may be small.

For the method of dividing to determine the relay point by means of the relay position setting unit 42, the following first to third examples can be employed. In the first place, the first example of the dividing method is shown in Table 1 below:

TABLE 1

|    | 1   | 2        | 3         | ... | n − 2            | n − 1            | N   |
|----|-----|----------|-----------|-----|------------------|------------------|-----|
| β1 | β1a | β1a + x  | β1a + 2x  | ... | β1a + (n − 3)x   | β1a + (n − 2)x   | β1b |
| β2 | β2a | β2a + y  | β2a + 2y  | ... | β2a + (n − 3)x   | β2a + (n − 2)x   | β2b |
| β3 | β3a |          |           |     |                  |                  | β3b |

In connection with the movement from the starting point position A to the terminating point position B, determination is made of the rotational angles of the arm axes β1, β2 and β3 and then selection is made of two arms which have exhibited a large amount of movement. Assuming that the arm axes exhibiting the large amount of movement are expressed by β1 and β2, the respective amounts of movement of the arms β1 and β2 are equally divided by a division number n which has been previously determined, and then respective rotational angle position of each of the arms 11 to 13 so divided is determined. In this condition, the division number n is such that the amount of movement of the distal end side link hub 15 from the starting point position A to the terminating point position B is expressed by L, the predetermined amount of movement is expressed by d, and L/d=m (quotient) . . . a (remainder), and the division number n is rendered to be n=m+1.

Regarding the rotational angle of the arm axis β3, with the use of the position (θn, φn) of the distal end side link hub 15 determined by the rotational angles of the biaxial arm axes β1 and β2 and the power rectifying algorithm, the arm rotational angle of β3 is obtained by means of the inverse transformation. With respect to the inverse transformation, the four angles of β1a, β2a, θ and φ satisfy the following equations (B) and (C) in view of the arm rotational angle of the link hub and the previously discussed relational equation (A):

$$f: \cos\theta\cdot\sin\beta 1a - \sin\theta\cdot\sin\phi\cdot\cos\beta 1a + \sin\gamma = 0 \equiv f(\theta,\phi) \quad (B)$$

$$g: \cos\theta\cdot\sin\beta 2a - \sin\theta\cdot\sin(\phi+\sigma)\cdot\cos\beta 2a + \sin\gamma = 0 \equiv g(\theta,\phi) \quad (C)$$

Since those equations (B) and (C) are nonlinear equations of the respective parameters θ and φ, solution is determined numerically. The calculation of determining the position (θn, φn) of the distal end side link hub 15 with the use of a forward transformation equation from the rotational angles of the biaxial arm axes β1 and β2 is carried out by means of, for example, the convergence calculation. Here, the parameter γ represents the axis angle determined depending on the designed structure of the link and σ represents the phase angle determined by respective arrangement positions of the three arms. Also, with respect to the inverse transformation, from the previously described relational equation (A) of the link hubs and the arm rotational angle, the arm rotational angles of β1, β2 and β3 at a certain link hub position (θ, φ) are uniquely determined. Table 2 below illustrates positions at which the rotational angle moving amount of three shafts are divided.

TABLE 2

|    | 1   | 2        | 3        | ... | n − 2              | n − 1          | N   |
|----|-----|----------|----------|-----|--------------------|----------------|-----|
| β1 | β1a | β1a + x  | β1a + 2x | ... | β1a + (n − 3)x     | β1a + (n − 2)x | β1b |
| β2 | β2a | β2a + y  | β2a + 2y | ... | β2a + (n − 3)x     | β2a + (n − 2)x | β2b |
| β3 | β3a | β3c      | β3d      | ... | β3p                | β3q            | β3b |

The link position control is carried out in such a manner that the rotational angle position of each of the shafts shown in Table 2 is moved in synchronism with the control performed by the synchronous control section 45.

Since according to this control the two arms 11a and 11b, which have the large amounts of movement, can move at a uniform speed at the maximum velocity of each of the axis, it can be driven in the shortest moving time. Also, unless the moving time is taken into consideration, selection of the two arms out of β1, β2, and β3 may be arbitrarily chosen. It is, however, to be noted that it does not warrant that the trace of the link distal end in this condition passes the shortest path.

The second dividing method is now shown. In the practice of this second method, one or more relay positions are taken on the path through which the distal end side link hub 15 moves in the shortest distance and, of the position on the path, which may be one of the starting point position, the relay position and the terminating point position, the rotational angle of each of the arms 11a to 13a corresponding to the position (θ, φ) of the link hub 15, in which the quantity such as, for example, the distance established between the neighboring positions assumes a value smaller than the predetermined quantity, is rendered to be the relay point. In this case, the rotational angle of each of the arms 11a to 13a may be determined from the above discussed position (θ, φ) of the link hub 15 according to the transformation equation of the inverse transformation.

The second dividing method is to determine, specifically with respect to the starting position (the bending angle and the pivot angle) A (θa, φa), and the terminating position B (θb, φb), the path of the distal end side link hub 15 which moves between the positions A and B may become the shortest distance as small as possible. In this condition, the time required to determine the path can be shortened when a proper approximation is made if so required. By dividing the path from the starting point position A to the terminating point position B into a plurality of positions, the rotational angle N (β1n, β2n and β3n) of the arm axis corresponding to each of the link hubs is obtained by means of the inverse transformation algorithm from the position N(θn, φn) of each of the distal end side link hubs 15.

The inverse transformation algorithm referred to above is, for example, a transformation to calculate the rotational angle βn from the bending angle θ and the pivot angle φ according to the previously discussed relational equation (A). The link position control is carried out so as to move the position of the actuator 3 of each axis simultaneously under the control of the synchronous control section 45.

The third dividing method is hereinafter shown. In the practice of this third method, from the certain starting point position A (θa, φa) and the terminating point position B (θb, φb) of the distal end side link hub 15, the position (θ1, θ2, ... θn, φ1, φ2, ... φn) of each of the distal end side link hubs 5, which have been so divided so that the moving amount delta Δθ of the bending angle θ and the moving amount Δφ of the pivot angle φ may attain respective values smaller than the predetermined moving amounts, is determined according to the transformation equation of the inverse transformation and the position (θ1, θ2, ... θn, φ1, φ2, ... φn) so determined is set to be the relay position. In this instance, n is equal to (dividing number −1).

The foregoing third dividing method is to determine, the bending angle moving amount Δθ and the pivot angle moving amount Δφ are individually equally divided specifically between the certain starting position (the bending angle and the pivot angle) A (θa, φa) and the terminating position B (θ1, φb) of the distal end side link hub 15, followed by determination of a plurality of positions of the distal end side link hub 15. The moving amount so divided at that time is rendered to be a value smaller than the predetermined moving angle. Thereafter, from each of the positions N (θa+n×Δθ/M, φa+n×Δφ/M) of the distal end side link hub 15, the rotational angle N (β1n, β2n, β3n) of the arm axis is obtained according to the inverse transformation algorithm. In this instance, N and n represent the serial number N (or n) and M represents the dividing number.

The link position control is carried out in such a manner as to achieve a synchronous movement of each of the shafts under the control of the synchronous control section 45. In this way, by equally dividing so as to render the moving amount Δθ of the bending angle θ and the moving amount Δφ of the pivot angle φ to attain respective values smaller than the predetermined moving amounts, the drive can be accomplished with a further minimized interference and with no excessive load imposed.

Figure 7:
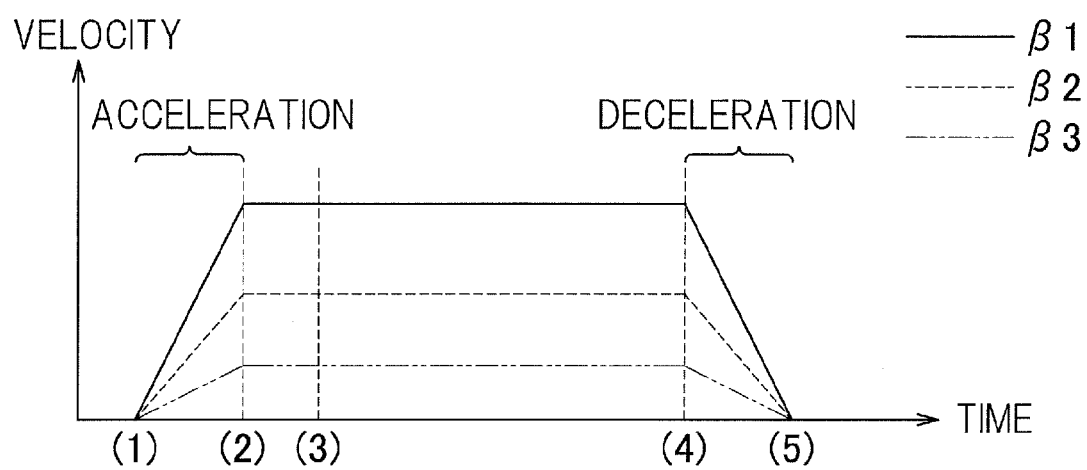
FIG. 7 is a chart showing the relationship between time and speed, showing one example of a control performed by the control device for the link actuator.

In any one of the first, second and third dividing methods discussed hereinabove, the synchronous control section 45 of the position change control unit 41 is preferably so designed that with respect to the path of movement from the certain starting point position A (θa, φa) to the certain terminating point position B (θb, φb) of the distal end side link hub 15 in the practice of the relevant dividing method, the control towards each of the rotational angle βA (β1a, β2a, β3a) of the arm axes β1 to β3 and the rotational angle βB (β1b, β2b, β3b) is preferably accomplished by means of a position control without acceleration and deceleration through the relay point on the course as shown in FIG. 7.

In such case, the rotational angle position of each of the shafts shown in Table 3 below is carried out so as to move synchronously under the control of the synchronous control section 45. In other words, with respect to the axes β1 to β3 of all of the arms 11a to 13a, the time (timing (1) to (2)), during which the acceleration in the trapezoidal velocity control takes place, and the time (timing (4) to (5)), during which the deceleration takes place, are aligned with each other and the control is made to allow each of the relay points to be passed during a period (timing (2) to (4)) such as, for example, the timing (3), in which the constant velocity operation such as takes place.

TABLE 3

| | (1) 1 | (2) 2 | (3) 3 | ... n − 2 | (4) n − 1 | (5) N |
|---|---|---|---|---|---|---|
| β1 | β1a | β1a + x | β1a + 2x | ... β1a + (n − 3)x | β1a + (n − 2)x | β1b |
| β2 | β2a | β2a + y | β2a + 2y | ... β2a + (n − 3)x | β2a + (n − 2)y | β2b |
| β3 | β3a | β3c | β3d | ... β3p | β3q | β3b |

By performing the positioning control without accelerating or decelerating the relay point in the manner described above, a smooth drove at a constant velocity can be accomplished from the starting point position A point to the terminating point position B.

According to any one of the foregoing embodiments, where the link actuator 1 is desired to be changed in position in a wide angle, the relative positional relationship of each of the arm rotational angles being then driven can accomplish a positioning control without being diverted considerably from the position at which the equation (A), which is uniquely defined by the mutual relationship between the plurality of the link mechanisms, and accordingly with no excessive load imposed on the link and the high speed movement is enabled.

Figure 8:
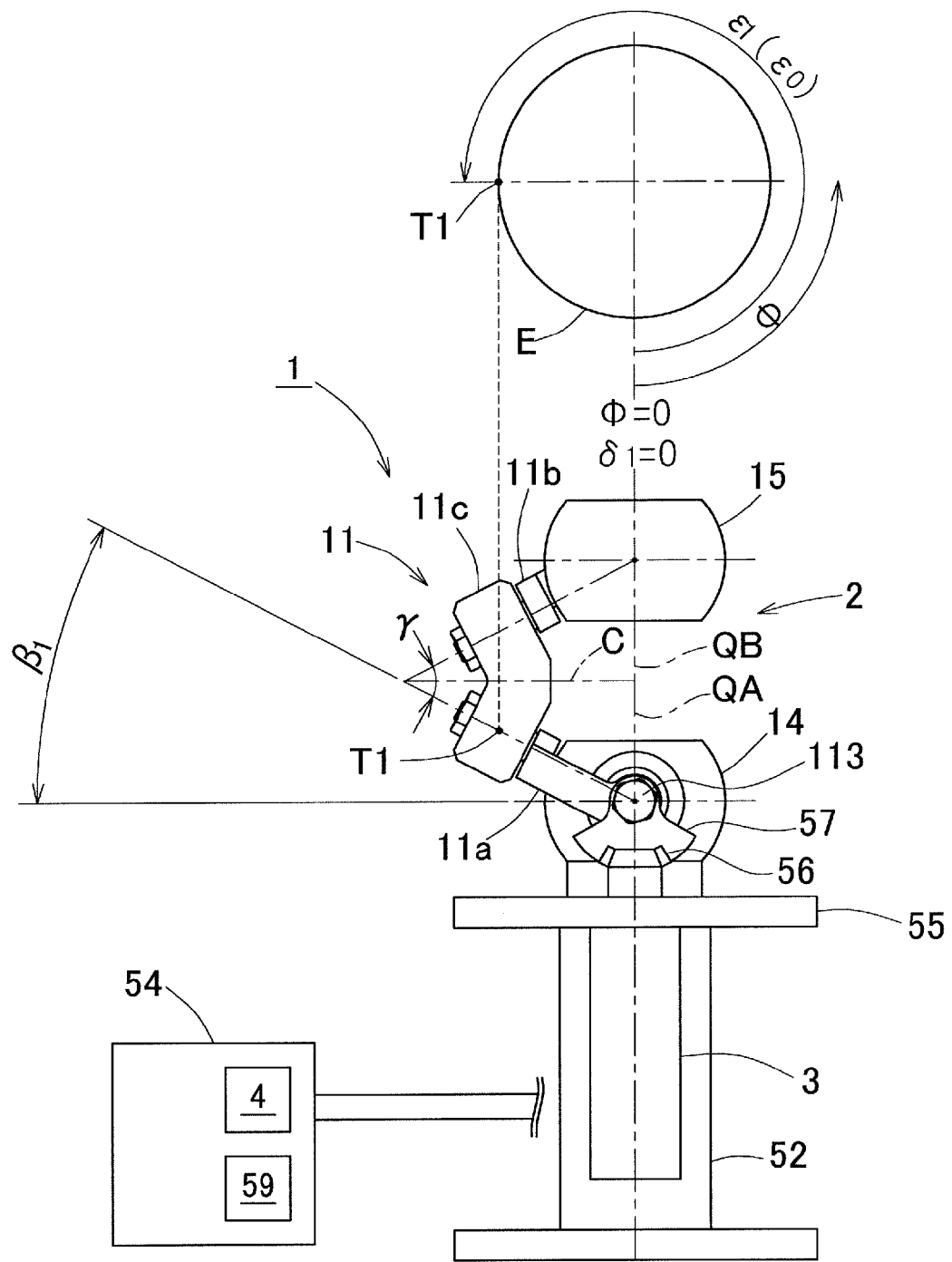
FIG. 8 is a diagram showing an explanatory diagram illustrating various angles in a circumferential direction, to which a front elevational view showing a portion of the link actuator according to a second embodiment of the present invention, with a portion thereof removed, is added.
Figure 9:
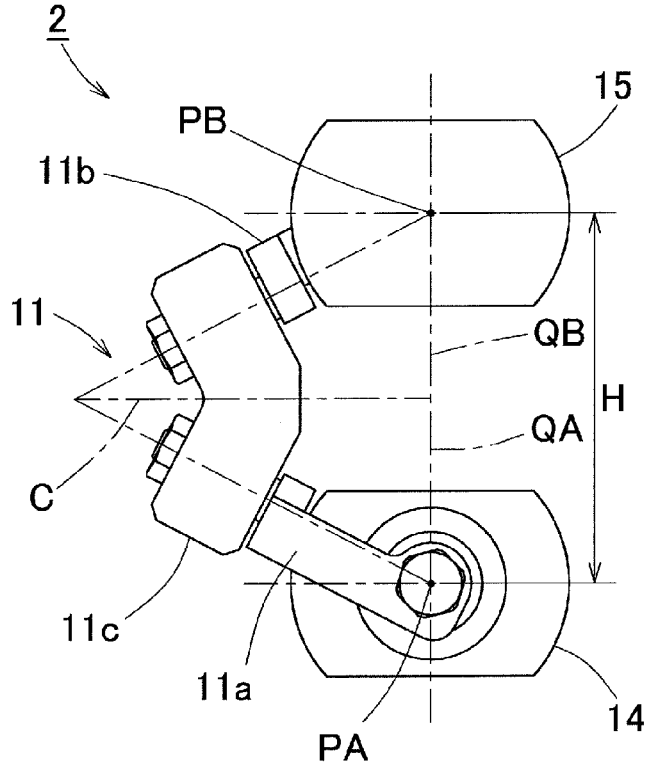
FIG. 9 is a front elevational view, with a portion removed, showing one condition of the link actuator main body of the link actuator.
Figure 10:
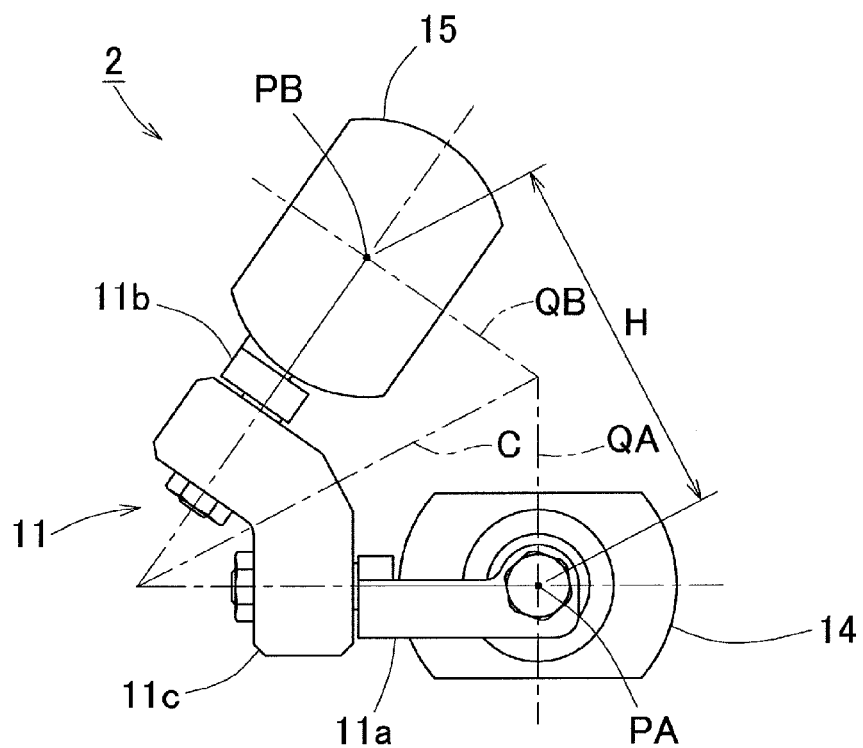
FIG. 10 is a front elevational view, with a portion removed, showing a different condition of the link actuator main body of the link actuator.

A second embodiment of the present invention will now be described with particular reference to FIGS. 8 to 13. Parts, which are shown in those figures, but similar to those shown and described in connection with the first embodiment of the present invention, are indicated by like reference numerals and the details thereof are not reiterated for the sake of brevity. FIG. 8 is a diagram in which an explanatory diagram descriptive of angles in various circumferential directions is shown is added to a front elevational view showing, with a portion thereof removed, the link actuator. As shown in FIG. 8, the illustrated link actuator 1 includes a link actuator main body 2, a base bench 52 for supporting the link actuator main body 2, a plurality of actuators 3 for actuating the link actuator main body 2, a control device 4 for controlling those actuators 3, and a position calculating device 59. In this example, the control device 4 and the position calculating device 59 are provided within a control unit 54, but the control device 4 and the position calculating device 59 may be provided separate from the control unit 54.

The proximal end side link hub 14 and the distal end side link hub 15 are each formed with a throughhole 10 extending through a center part thereof in an axial direction and is of a ring shape with its exterior shape represented by a spherical shape. The center of the throughhole 10 is aligned with respective center axes QA and QB of the proximal end side and distal end side link bubs 14 and 15.

Respective revolute pair center axes S1 and S2 of the end link members 11a to 13a, 11b to 13b and the intermediate link members 11c to 13c may have a certain crossed axes angle therebetween or may extend parallel to each other. In the example as shown they have the crossed axes angle and this crossed axes angle is referred to as the "axis angle γ of the intermediate link member". The revolute pair center axis S1 is a "connecting end axis of the intermediate link member pivotably connected with the proximal side end link member" and the revolute pair center axis S2 is a "connecting end axis of the intermediate link member pivotably connected with the distal side end link member".

The bending angle θ represents a vertical angle for which the center axis QB of the distal end side link hub 15 is inclined relative to the center axis QA of the proximal end side link hub 14, and the pivot angle φ represents a horizontal angle in which the center axis QB of the distal end side link hub 15 is inclined relative to the center axis QA of the proximal end side link hub 14. It is to be noted that the pivot angle φ has a positive direction which is a counterclockwise direction as viewed from the side of the distal end side link hub 15.

Figure 13:
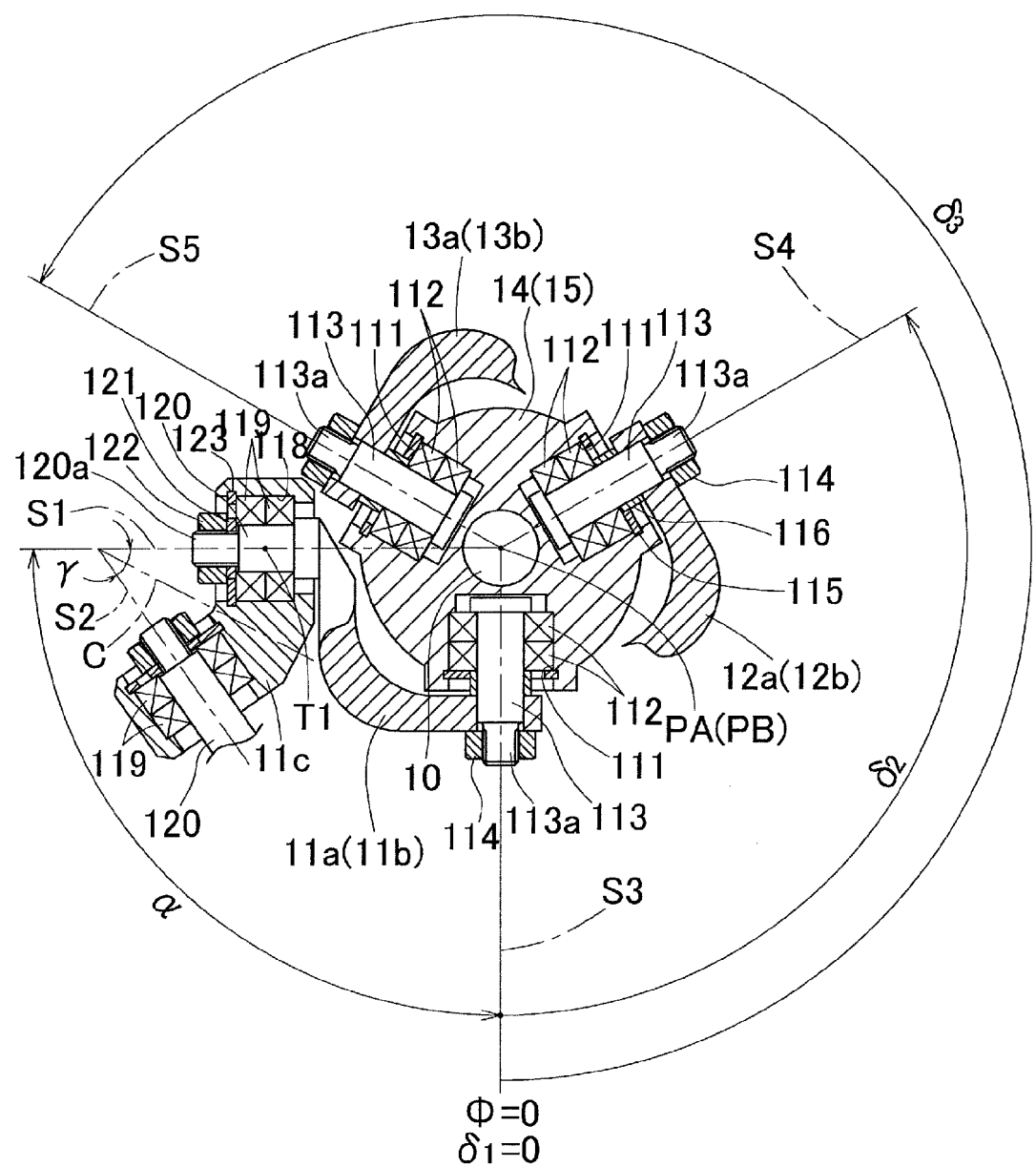
FIG. 13 is a sectional view in which the proximal end side link hub, the proximal side end link member and the intermediate link member of the link actuator are shown in a developed form.

FIG. 13 is a sectional view showing the proximal end side link hub 14, the proximal side end link members 11a to 13a and the intermediate link members 11c to 13c in a deployed form. The proximal end side link hub 2 is formed at three circumferential locations with a radially extending shaft holes 111 that communicates between a throughhole 10 in the axial direction and an outer peripheral side thereof, and a shaft member 113 is rotatably supported by two bearings 112 provided within the respective shaft holes 111. In the example as shown, each of the shaft members 113 are positioned in circumferentially equally spaced relation, but this is not limited thereto. The shaft member 113 has an outer side end portion protruding from the proximal end side link hub 14, the proximal side end link members 11a to 13a is connected with its protruding threaded portion 113a and is fixedly fastened with a nut 114. In the example as shown, the axis angle α of the end link member is chosen to be 90 degrees, but this is not necessarily limited thereto.

The bearing 112 referred to above is a rolling bearing in the form of, for example, a deep groove ball bearing, its outer ring (not shown) being mounted on an inner periphery of the shaft hole 11 while its inner ring (also not shown) is mounted on an outer periphery of the shaft member 113. The outer ring is non-detachably retained by a stop ring 115. Also, a spacer 116 is interposed between the inner ring and the proximal side end link members 11a to 13a, and a fastening force of the nut 114 is transmitted to the inner ring through the proximal side end link members 11a to 13a and the spacer 116 to thereby apply a predetermined preload to the bearing 112.

The circumferential phase of each of the proximal side end link members 11a to 13a in the circumferential direction is indicated in the following manner. Specifically, one of the link mechanisms 11 to 13, which forms a reference, is fixed as a link mechanism 11 forming the reference, and the circumferential phase of a connecting end axis (indicative of a revolute pair center axis S3) of the proximal side end link member 11a in the link mechanism 11 forming the reference is indicated by δ1 (for example, δ1=0°). Then, circumferential separating angles of connecting end axes S4 and S5 of the other two proximal side end link members 12a and 13a relative to the connecting end axis S3 of this proximal side end link member 11a are indicated by δ2 and δ3, respectively. The separating angle δn (n=1, 2, 3) has a positive direction defined in a counterclockwise direction when viewed from the side of the distal end side link hub 15.

Also, with respect to the revolute pair portions T1 to T3 of the proximal side end link members 11a to 13a and the intermediate link members 11c to 13c, such a structure is employed that two bearings 119 are provided in respective communicating holes 118 at opposite ends of the intermediate link members 11c to 13c and, by means of those bearings 119, a shaft portion 120 at a distal end of the proximal side end link members 11a to 13a is rotatably supported. The bearings 119 are fixedly fastened by respective nuts 122 through corresponding spacers 121.

The bearing referred to above is a rolling bearing such as, for example, a deep groove ball bearing with its outer ring (not shown) mounted on an inner periphery of the communicating hole 118 whereas its outer inner ring (also not shown) is mounted on an outer periphery of the shaft portion 120. A fastening force of the nut 122 treaded onto a distal end threaded area 120a of the shaft portion 120 is transmitted to the inner ring through a spacer 121 with a predetermined preload applied to the bearing 119.

In FIG. 13, the revolute pair portion T1 of the proximal side end link members 11a to 13a and the intermediate link members 11c to 13c is shown at a center position in an axial direction of the two bearings 119 on its revolute pair center axis S1. In place thereof, the revolute pair portion T1 may be expressed by a position on the revolute pair center axis S1 and where in all of the three link mechanisms 11 to 13 the distances from a spherical surface center PA of the proximal end side link hub 14 is the same. Where the revolute pair portion T1 is expressed by the position of the single point in this way, as shown in FIG. 8, the revolute pair portion T1 of each of the link mechanisms 11 to 13 remains positioned on the same circumference E.

The circumferential phase of the revolute pair portion T1 of each of the link mechanisms 11 to 13 is shown as follows. Specifically, the separating angle of the revolute pair portion T1 of the rink mechanism 11, which forms the reference, in a circumferential direction relative to the connecting end axis S3 of the proximal side end link member 11a is expressed by $\epsilon 1$. And, the separating angles of the other two revolute pair portions T1 in the circumferential direction relative to the revolute pair portion T1 of the link mechanism 11 which forms the reference are expressed by $\epsilon 2$ and $\epsilon 3$ (not shown), respectively. Even in the separating angle $\epsilon n$ (n=1, 2, 3) the counterclockwise direction as viewed from the side of the distal end side link hub 15 is rendered to be a positive direction. Also, as shown in FIG. 8, the circumferential phase of the revolute pair portion T1 of the link mechanism 11, which forms the reference, in a condition in which the position of the leading side link hub 15 lies at the position of origin ($\theta=0$, $\phi=0$) is rendered to be $\epsilon 0$.

Although the connecting structure between the proximal end side link hub 14 and the proximal side end link members 11a to 13a and the connecting structure between the proximal side end link members 11a to 13a and the intermediate link members 11c to 13c have been described with particular reference to FIG. 13, the connecting structure between the distal end side link hub 15 and the distal side end link members 11b to 13b and the connecting structure between the distal side end link members 11b to 13b and the intermediate link members 11c to 13c are understood as having the same structures as those described above.

As described above, the use of the structure in which bearings 112 and 119 are provided in the four revolute pair portions T1 to T4 in each of the link mechanisms 11 to 13 is effective to relieve the rotational resistance while the frictional resistance occurring in each of the revolute pair portions T1 to T4 is suppressed and, therefore, not only can a smooth power transmission be secured, but also the durability is increased.

In the structure in which the bearings 112 and 119 are provided, application of the preloads to the respective bearings 112 and 119 is effective to suppress the saccadic movement of the revolute pair portion T1 to T4 with the radial gap and the thrust gap having been eliminated, and also effective to eliminate the rotational phase difference between the proximal end side link hub 14 side and the distal end side link hub 15 side to allow the constant velocity property to be maintained and also to suppress an undesirable generation of vibrations and abnormal sounds. In particular, by rendering the bearing gap in the bearings 112 and 119 to be a negative gap, the backlash occurring between input and output can be minimized.

Because the bearing 112 is provided in the form as embedded in the proximal end side link hub 14 and the distal end side link hub 15, the exterior shape of the proximal end side link hub 14 and the distal end side link hub 15 can be increased without the exterior shape of the link actuator main body 2 in its entirety being increased. For this reason, a mounting space can be easily secured for the proximal end side link hub 14 and the distal end side link hub 15 to be fitted to any other member.

Referring now to FIG. 8, the base bench 52 referred to previously is a vertically long member, and the proximal end side link hub 14 of the link actuator main body 2 is fixed on a top surface thereof. At an outer periphery of a top portion of the base bench 52, a collar shaped actuator mounting stand 55 is provided, and the actuator 3 referred to previously is fitted to this actuator mounting stand 55 in a dependent form. The number of the actuators 3 is three which is the same as the number of the link mechanisms 11 to 13. The actuator 3 is in the form of a rotary actuator and a bevel gear 56 mounted on an output shaft thereof and a sector shaped bevel gear 57 mounted on a shaft member 113 of the proximal end side link hub 14 are meshed with each other.

This link actuator 1 actuates the link actuator main body 2 when each of the actuators 3 is rotationally driven by manipulating an operating tool (not shown) provided in the control unit 54. Specifically, when the actuator 3 is rotationally driven, the rotation thereof is transmitted to the shaft member 113 through the pair of the bevel gears 56 and 57 and the angle of the proximal side end link members 11a to 13a relative to the proximal side end link hub 14 changes. Accordingly, the position of the distal end side link hub 15 relative to the proximal end side link hub 14 is determined. Although in the instance now under discussion the angle of the proximal side end link members 11a to 13a has been changed with the use of the bevel gears 56 and 57, any other mechanism such as, for example, spur gears or warm gears may be employed.

The control unit 54 includes the control device 4 for controlling each of the actuators 3 and the position calculating device 59 for calculating the position ($\theta$, $\phi$) of the distal end side link hub 15. The control device 4 and the position calculating device 59 are of a numerically controlled system by means of a computer. In the instance now under discussion, the control device 4 and the position calculating device 59 has been described as devices separate from each other, those devices 58 and 59 may be brought together to provide a single device.

The control device 4 referred to above, when the position of the distal end side link hub 15 is commanded from the operating tool, determined the rotational angle $\beta n$ (n=1, 2, 3) of each of the proximal side end link members 11a to 13a in dependence on the position of the distal end side link hub 15 so commanded and then controls each of the actuator 3 so as to assume the rotational angle $\beta n$ so determined. The rotational angle $\beta n$ is a rotational angle of each of the proximal side end link members 11a to 13a which corresponds to the position of the distal end side link hub 15 so commanded and is rendered to be, for example, an angle from a horizontal plane as shown in FIG. 8.

Figure 11:
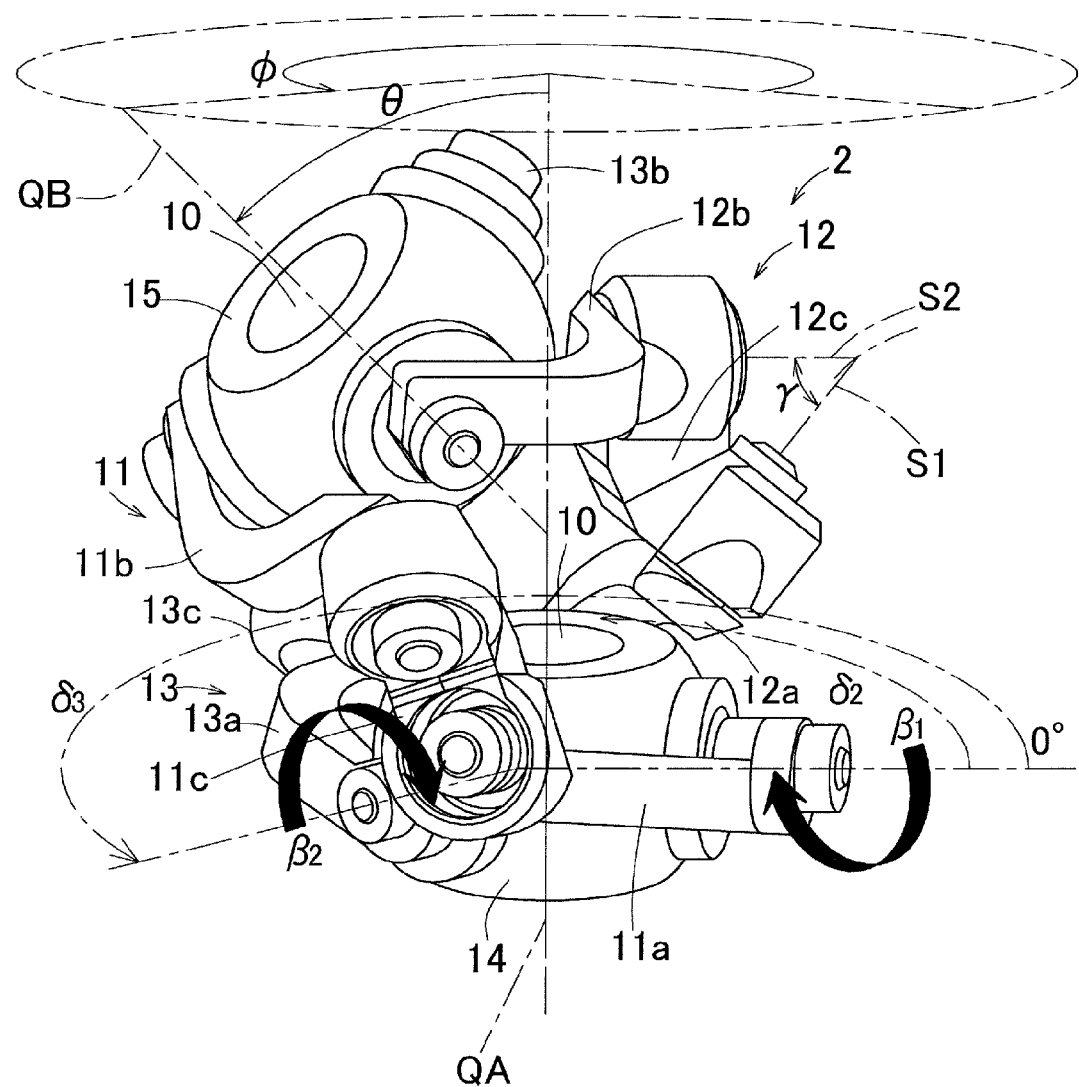
FIG. 11 is a perspective view of the link actuator of the link actuator depicted in three dimension.
Figure 12:
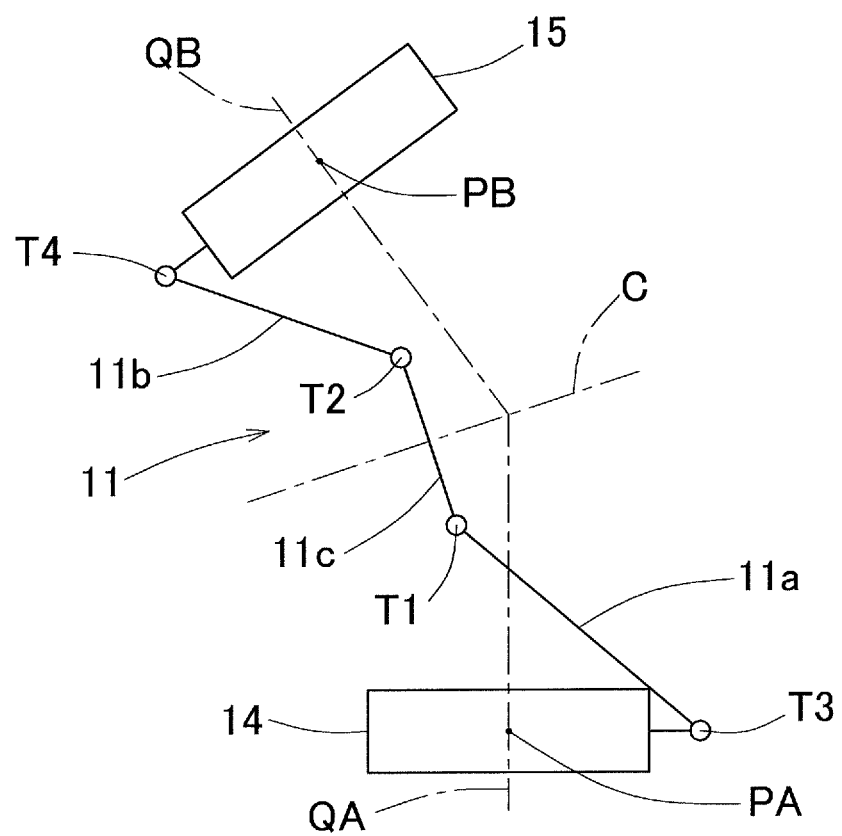
FIG. 12 is a diagram showing one link mechanism of the link actuator shown by a line.

The rotational angle $\beta n$ corresponding to the commanded distal end side link hub 15 is determined by means of the inverse transformation of the equation 1 so that the relationship expressed by the equation 1 is satisfied. The inverse transformation referred to above is defined as a transformation to calculate the rotational angle $\beta n$ of the proximal side end link members 11a to 13a from the bending angle $\theta$ and the pivot angle φ (FIG. 11). The bending angle θ and the pivot angle φ are in mutual relationship with the rotational angle βn, and it is possible to derive from one value to the other value.

$$\begin{pmatrix} \cos(\gamma/2)\cos\varepsilon 0 \\ \pm\sin\alpha\cos\beta n \\ \sin\alpha\sin\beta n \end{pmatrix} =$$

$$\begin{pmatrix} \cos(\phi-\delta n) & -\sin(\phi-\delta n) & 0 \\ \sin(\phi-\delta n) & \cos(\phi-\delta n) & 0 \\ 0 & 0 & 1 \end{pmatrix}\begin{pmatrix} \cos(\theta/2) & 0 & \sin(\theta/2) \\ 0 & 1 & 0 \\ -\sin(\theta/2) & 0 & \cos(\theta/2) \end{pmatrix}$$

$$\begin{pmatrix} \cos(\phi-\delta n) & \sin(\phi-\delta n) & 0 \\ -\sin(\phi-\delta n) & \cos(\phi-\delta n) & 0 \\ 0 & 0 & 1 \end{pmatrix}\begin{pmatrix} \cos(\gamma/2)\cos\varepsilon n \\ \cos(\gamma/2)\sin\varepsilon n \\ \sin(\gamma/2) \end{pmatrix}$$

Equation 1

$$\varepsilon_0 = \pm\sin^{-1}\left(\sqrt{\frac{\sin^2\alpha - \sin^2(\gamma/2)}{\cos^2(\gamma/2)}}\right).$$

Equation 2

It is to be noted that the 3×3 matrix on the right side of the equation 1 is a transformation matrix according Euler angle of (φ−δn), θ, −(φ−δn).

The circumferential phase ε0 of the revolute pair portion T1 of the link mechanism 11 forming the reference has two mutually different solutions depending on the direction of assemblage of the proximal side end link members 11a to 13a relative to the proximal end side link hub 14. Accordingly, the positive or negative on the second line in the left side of the equation 1 and the positive or negative in the right side of the equation 2 are to be determined depending on the direction of assemblage of the proximal end side end links 11a to 13a relative to the proximal end side link hub 14. When the direction of assemblage is rightward direction, "+" is assigned, and when the direction of assemblage is leftward direction, "−" is assigned. By way of example, if the proximal side end link members 11a to 13a are assembled in the leftward direction as is the case with the second embodiment shown in FIG. 8, the equations 1 and the equation 2 are defined as the following equations 3 and 4, respectively.

$$\begin{pmatrix} \cos(\gamma/2)\cos\varepsilon 0 \\ -\sin\alpha\cos\beta n \\ \sin\alpha\sin\beta n \end{pmatrix} =$$

$$\begin{pmatrix} \cos(\phi-\delta n) & -\sin(\phi-\delta n) & 0 \\ \sin(\phi-\delta n) & \cos(\phi-\delta n) & 0 \\ 0 & 0 & 1 \end{pmatrix}\begin{pmatrix} \cos(\theta/2) & 0 & \sin(\theta/2) \\ 0 & 1 & 0 \\ -\sin(\theta/2) & 0 & \cos(\theta/2) \end{pmatrix}$$

$$\begin{pmatrix} \cos(\phi-\delta n) & \sin(\phi-\delta n) & 0 \\ -\sin(\phi-\delta n) & \cos(\phi-\delta n) & 0 \\ 0 & 0 & 1 \end{pmatrix}\begin{pmatrix} \cos(\gamma/2)\cos\varepsilon n \\ \cos(\gamma/2)\sin\varepsilon n \\ \sin(\gamma/2) \end{pmatrix}$$

Equation 3

$$\varepsilon_0 = -\sin^{-1}\left(\sqrt{\frac{\sin^2\alpha - \sin^2(\gamma/2)}{\cos^2(\gamma/2)}}\right)$$

Equation 4

By controlling each of the actuators 3 so that the rotational angle βn so determined as hereinabove described can establish, the position (θ, φ) of the leading side link hub 15 attains the targeted position. Since in the equation 3 above, the function of the axis angle α of the end link member is not contained, if the axis angle α of the end link member of the link actuator 1 is substituted for the parameter α in the equation 3, the operation can be controlled even with the link actuator in which the axis angle α of the end link member is other than 90 degrees.

Also, when by means of the position calculating device 59, the rotational angle βn of the current proximal side end link members 11a to 13a is inserted in the equation 3 above and the forward transformation is then performed, the position (θ, φ) of the current distal end side link hub 15 is calculated. Since the equation 3 above contains a function of the axis angle α of the end link member, substitution of the axis angle α of the end link member of the link actuator 1 for the parameter α in the equation 3 makes it possible to calculate the position (θ, φ) of the distal end side link hub 15 in the link actuator 1 in which the axis angle α of the end link member is other than 90 degrees.

Figure 14:
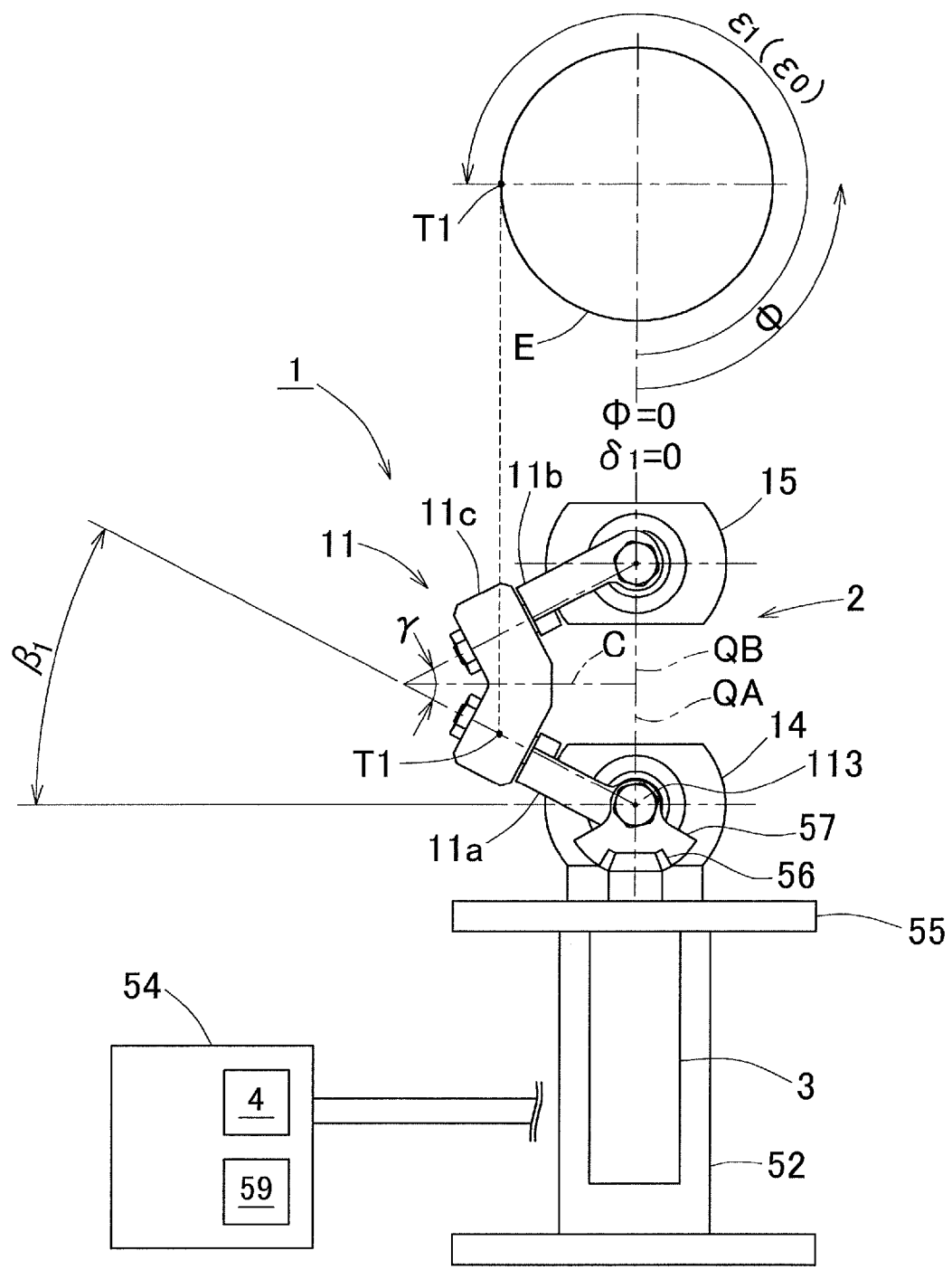
FIG. 14 is a diagram in which an explanatory diagram showing the various angles in the circumferential direction is added to a front elevational view showing, with a portion removed, the link actuator according to a third embodiment of the present invention.

FIG. 14 illustrates a third embodiment which is directed to the system in which the link mechanisms 11 to 13 of the link actuator main body 2 are in a mirror image symmetry. This link actuator 1 is of such a design that the positional relationship between the proximal end side link hub 14 and the proximal side end link members 11a to 13a and the distal end side link hub 15 and the distal side end link members 11b to 13b are so positioned as to assume a mirror image symmetry with respect to the center line C of the intermediate link members 11c to 13c. Other structural features than those described above are identical with those shown in FIG. 8 and employed in the practice of the second embodiment. Since even the third embodiment shown in FIG. 14, as is the case with the previously described first embodiment shown in FIG. 8, the proximal side end link members 11a to 13a are assembled in the leftward direction with respect to the proximal end side link hub 14, it is possible to control the actuator 3 and calculate the position of the distal end side link hub 15 with the use of the relational equations 3 and 4 referred to hereinbefore.

Figure 15:
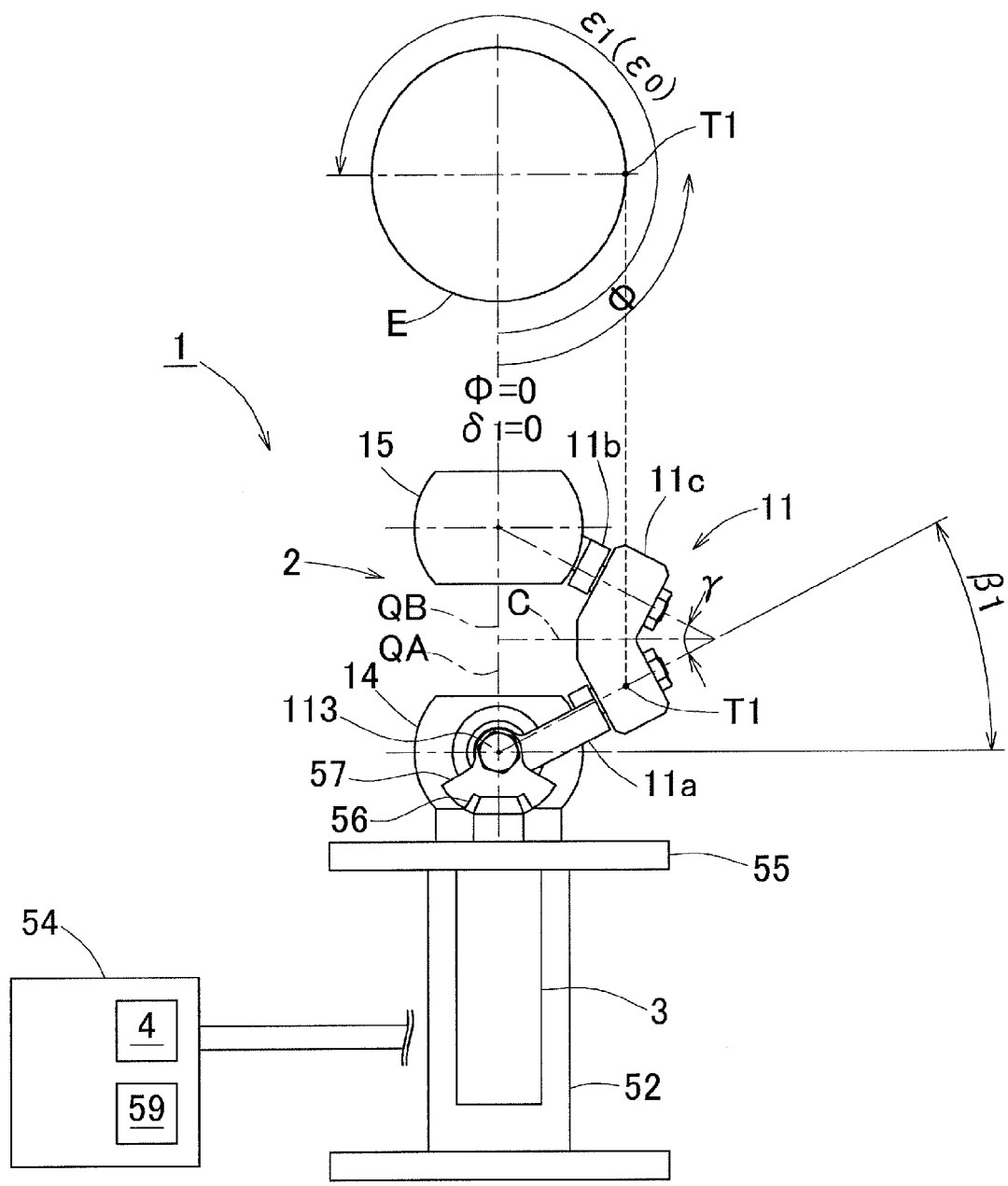
FIG. 15 is a diagram in which an explanatory diagram showing the various angles in the circumferential direction is added to a front elevational view showing, with a portion removed, the link actuator according to a fourth embodiment of the present invention.
Figure 16:
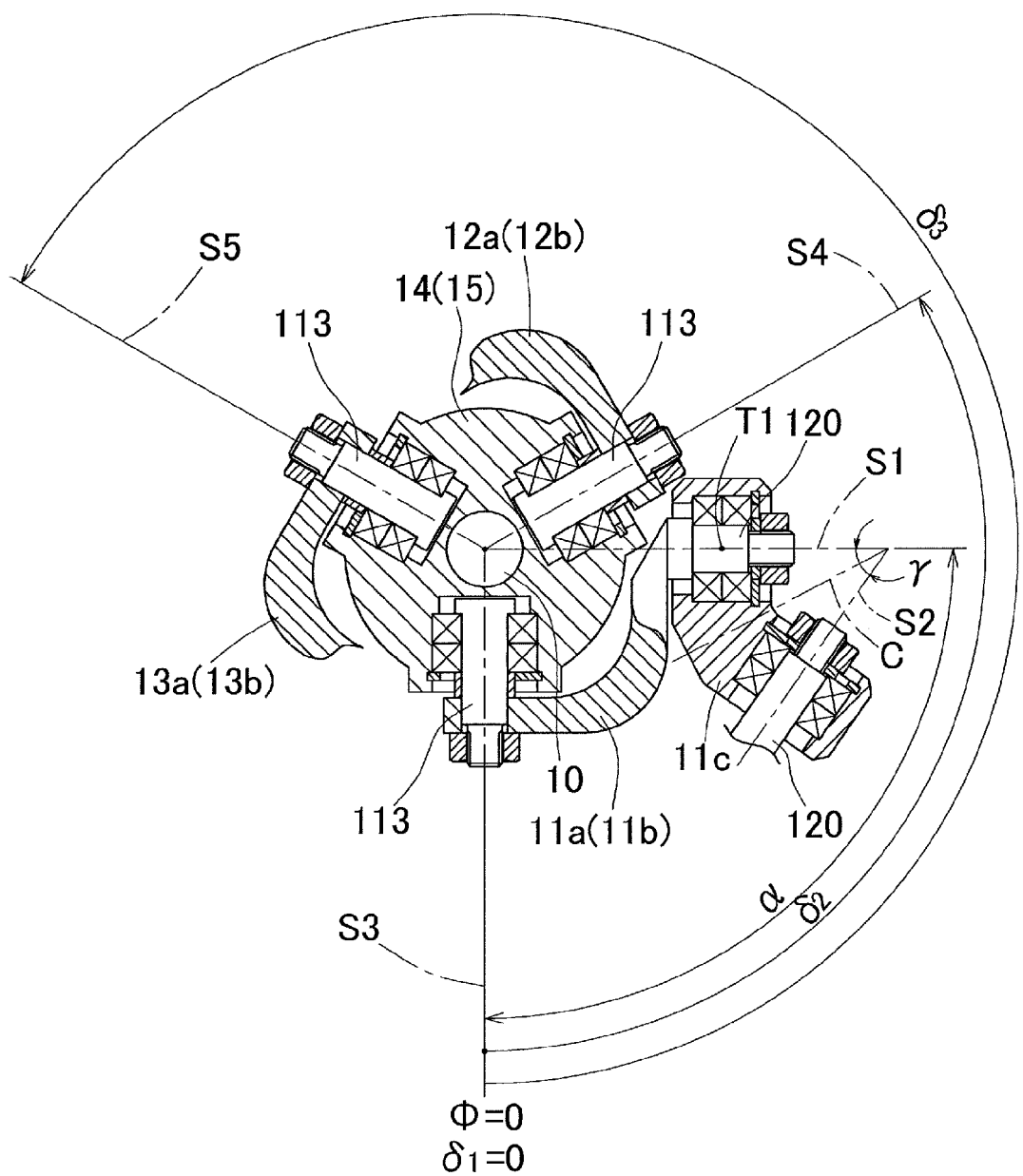
FIG. 16 is a sectional view showing the proximal end side link hub, the proximal side end link member and the intermediate link member of the link actuator in a developed form.

FIGS. 15 and 16 illustrate the link actuator 1 designed in accordance with a fourth embodiment. This link actuator 1 is of such a design that each of the link mechanisms 11 to 13 of the link actuator main body 2 is of a rotational symmetrical type and the proximal end side end link 11a to 13a are assembled in the right direction relative to the proximal end side link hub 14. In the case of this link actuator 1, the positive or negative on the second line in the left side of the equation 1 and the positive or negative in the right side of the equation 2 represent "+" and are defined by the following equations 5 and 6. Using those equations 5 and 6, it is possible to control the actuator 3 and calculate the position of the distal end side link hub 15.

$$\begin{pmatrix} \cos(\gamma/2)\cos\varepsilon 0 \\ \sin\alpha\cos\beta n \\ \sin\alpha\sin\beta n \end{pmatrix} =$$

Equation 5

$$\begin{pmatrix} \cos(\phi-\delta n) & -\sin(\phi-\delta n) & 0 \\ \sin(\phi-\delta n) & \cos(\phi-\delta n) & 0 \\ 0 & 0 & 1 \end{pmatrix}\begin{pmatrix} \cos(\theta/2) & 0 & \sin(\theta/2) \\ 0 & 1 & 0 \\ -\sin(\theta/2) & 0 & \cos(\theta/2) \end{pmatrix}$$

$$\begin{pmatrix} \cos(\phi-\delta n) & \sin(\phi-\delta n) & 0 \\ -\sin(\phi-\delta n) & \cos(\phi-\delta n) & 0 \\ 0 & 0 & 1 \end{pmatrix}\begin{pmatrix} \cos(\gamma/2)\cos\varepsilon n \\ \cos(\gamma/2)\sin\varepsilon n \\ \sin(\gamma/2) \end{pmatrix}$$

$$\varepsilon_0 = \sin^{-1}\left(\sqrt{\frac{\sin^2\alpha - \sin^2(\gamma/2)}{\cos^2(\gamma/2)}}\right)$$

Equation 6

Figure 17:
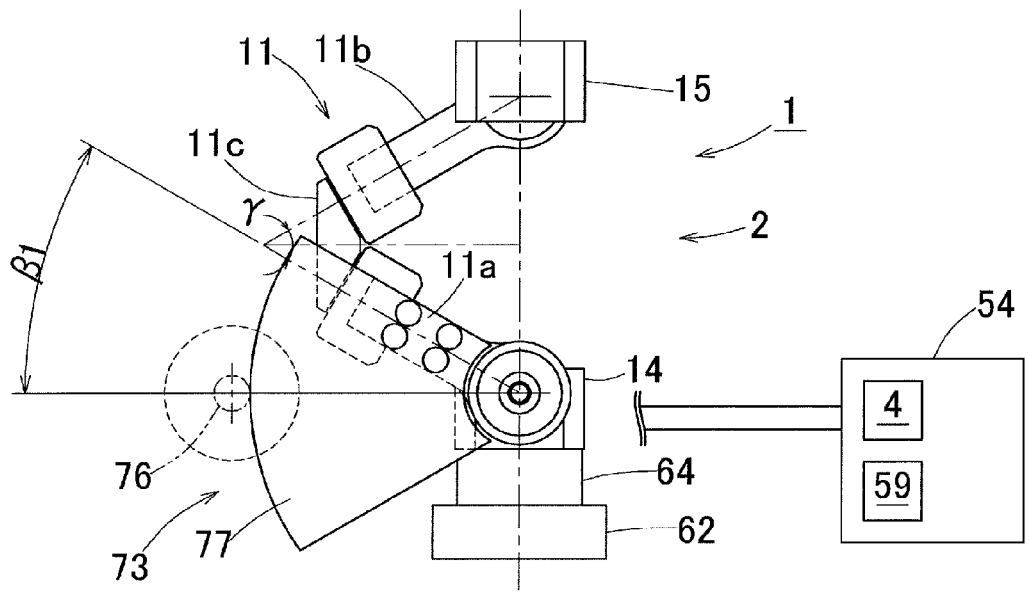
FIG. 17 is a front elevational view showing, with a portion removed, the link actuator according to a fifth embodiment of the present invention.
Figure 18:
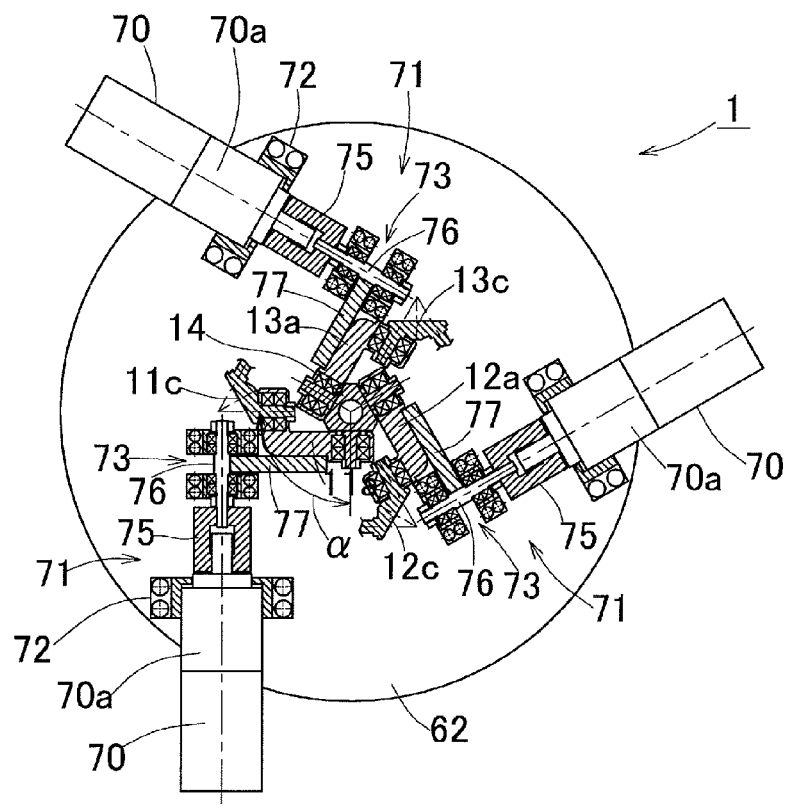
FIG. 18 is a sectional view showing the proximal end side link hub, the proximal side end link member and the intermediate link member of the link actuator in a developed form.
Figure 19:
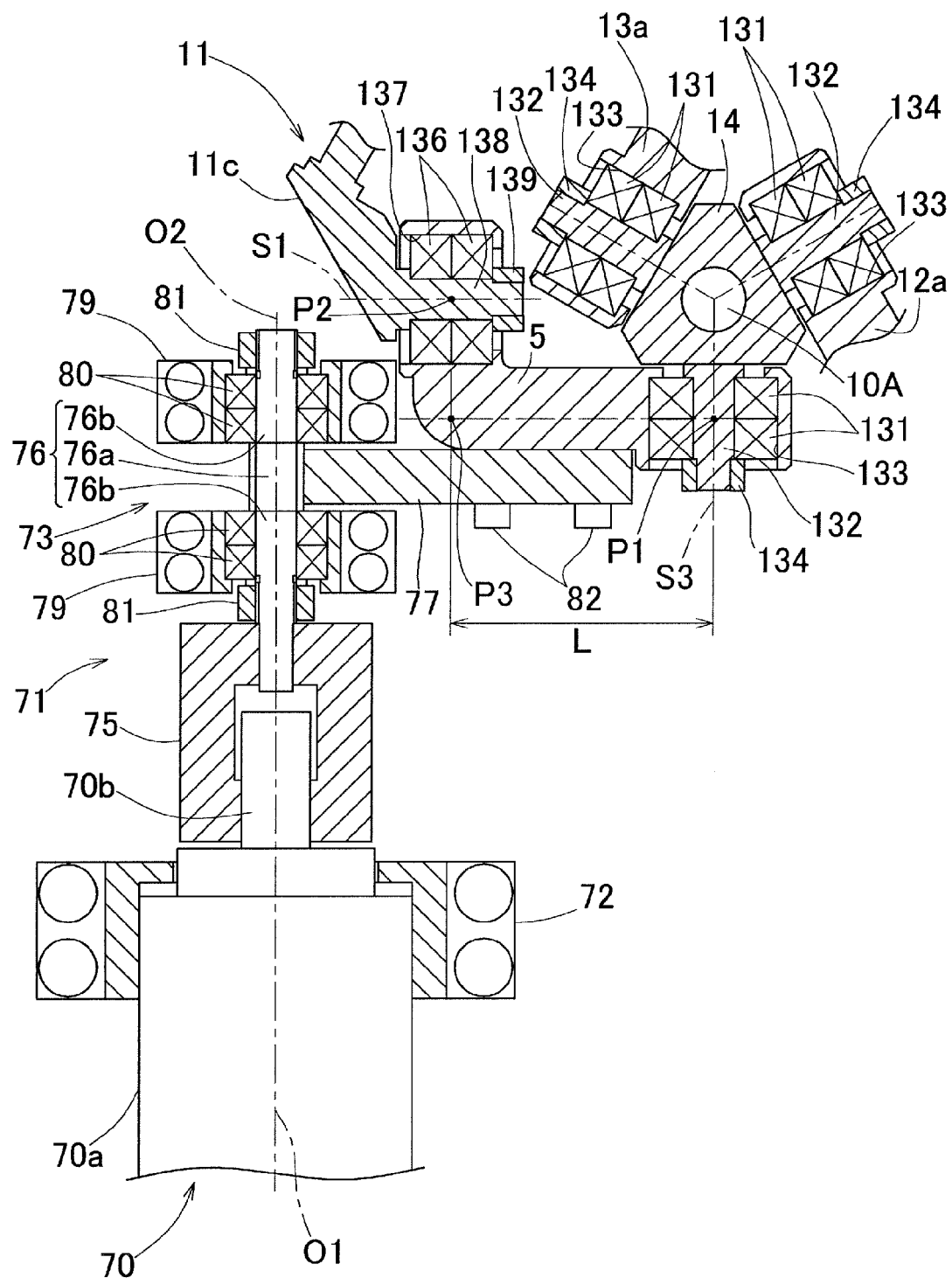
FIG. 19 is a fragmentary enlarged view of FIG. 18.

FIGS. 17 to 19 illustrate a link actuator according to a fifth embodiment. This link actuator 1 is of such a design that as shown in FIG. 17, the proximal end side link hub 14 of the link actuator main body is disposed on a base bench 62 through a spacer 64. The link actuator main body 2 is of such a design that the proximal side end link members 11a to 13a are assembled in the leftward direction relative to the proximal end side link hub 14. For this reason, using the relational equations 3 and 4 discussed hereinbefore, the control of the actuator 70 as will be described later and the calculation of the position of the distal end side link hub 15 can be achieved.

As shown in FIGS. 18 and 19, the link actuator main body 2 is of such a design that the bearings 131 for rotatably supporting the end link members 11a to 13a and 11b to 13b relative to the proximal end side link hub 14 and the distal end side link hub 15 are rendered to be of an outer ring rotating type.

To describe, by way of example, the revolute pair defined by the proximal end side link hub 14 and the proximal side end link members 11a to 13a, a shaft portion 132 is formed at three circumferential locations of the proximal end side link hub 14, an inner ring (not shown) of two bearings 131 are mounted on an outer periphery of the shaft portion 132, and an outer ring (not shown) of the bearing 131 is mounted on an inner periphery of a communicating hole 133 formed in the proximal side end link members 11a to 13a. The bearing 131 is a ball bearing such as, for example, a deep groove ball bearing or an angular contact ball bearing and fixed in a condition with a predetermined preload amount applied by means of fastening of a nut 134. The revolute pair defined by the distal end side link hub 15 and the distal side end link members 11b to 13b is also constructed identical with the above construction.

Also, a bearing 136 provided at a connection portion between the proximal side end link members 11a to 13a and the intermediate link members 11c to 13c has an outer ring (not shown), which is mounted on an inner periphery of a communicating hole 137 formed at a distal end of the proximal side end link members 11a to 13a, and also has an inner ring (not shown) which is mounted on an outer periphery of a shaft portion 138 that is integral with the intermediate link members 11c to 13c. This bearing 136 is a ball bearing such as, for example, a deep groove ball bearing or angular contact ball bearing and is fixed in a condition with a predetermined preload amount applied thereto by means of fastening of a nut 139. The revolute pair defined by the distal side end link members 11b to 13b and the intermediate link members 11c to 13c is also constructed identical with the construction described above.

In all of the three link mechanisms 11 to 13 of the link actuator main body 2, an actuator 70, which is operable to rotate the proximal side end link members 11a to 13a to change the distal end position arbitrarily, and a speed reducing mechanism 71, which is operable to decelerate and transmit the amount of operation of the actuator 70 to the proximal side end link members 11a to 13a, are provided. The actuator 70 is in the form of a rotary actuator, specifically a servo motor equipped with a speed reducer 70a and is fixed on the base bench 62 by means of a motor fixing member 72. The speed reducing mechanism 71 is made up of a speed reducer 70a for the actuator 70 and a gear type speed reducer 73. In the description that follows, a spur gear is employed in the speed reducing mechanism 71, but any other mechanism such as, for example, a bevel gear and/or a work mechanism may be employed.

The speed reducer 73 of the gear type is made up of a small gear 76, which is connected with an output shaft 70b of the actuator 70 through a coupling 75 so as to achieve a rotation transmission, and a large gear 77, which is fixed to the proximal side end link member 5 and is meshed with the small gear 76. In the example as shown, each of the small gear 76 and the large gear 77 is in the form of a spur gear, and the large gear is a sector gear having serrations formed in a peripheral surface of the sector shape. The large gear 77 has a pitch circle radius (radius of the pitch circle) greater than that of the small gear 76, and the rotation of the output shaft 70b of the actuator 70 is, after having been decelerated into rotation about the revolute pair center axis S1 between the proximal end side link hub 14 and the proximal side end link members 11a to 13a, transmitted to the proximal side end link members 11a to 13a. The reduction gear ratio thereof is set to a value greater than 10.

The large gear 77 has the pitch circle radius so chosen as to be ½ of more of the arm length L of the proximal side end link members 11a to 13a. The arm length L referred to above is the distance from an axial direction center point P1 of the revolute pair center axis S3 between the proximal end side link hub 14 and the proximal side end link members 11a to 13a to a point P3, which is defined by projecting a axial center point P2 on a revolute pair central axis S1 formed between the proximal side end link members 11a to 13a and intermediate link members 11c to 13c onto a plane passing across the axial direction center point P1 in a direction perpendicular to the revolute pair center axis S3 between the proximal end side link hub 14 and the proximal side end link members 11a to 13a. In the case of the embodiment now under discussion, the pitch circle radius of the large gear 77 is greater than the arm length L discussed above. For this reason, it is advantageous to secure a high speed reduction ratio.

The small gear 76 referred to above has shaft portions 76b protruding respectively from opposite sides of a threaded portion 76a meshed with the large gear 77, and those opposite shaft portions 76b are rotatably supported on a rotary support member 79, installed on the base bench 62, through two bearings 80, respectively. Each of the bearings 80 is a ball bearing such as, for example, a deep groove ball bearing or an angular contact ball bearing. Other than the ball bearing being arranged in a plurality of rows as shown, a roller bearing or a slide bearing may be used. A shim (not shown) is provided between each outer rings (not shown) of those two bearings 80 and, by fastening a nut 81 threaded onto the shaft portion 76b, a preload is applied to the bearing 80. The outer ring of the bearing 80 is press fitted into the rotary support member 79.

In the case of the above described fifth embodiment, the large gear 77 is a member separate from the proximal side end link members 11a to 13a and is removably fitted to the proximal side end link members 11a to 13a by means of a connecting member 82 such as, for example, bolt. This large gear 77 may be integral with the proximal side end link members 11a to 13a.

The rotational axis center O1 of the actuator 70 and the rotational axis center O2 of the small gear 76 are so positioned as to be coaxial with each other. Those rotational axis centers O1 and O2 are rendered to be parallel to the revolute pair axis S3 between the proximal end side link hub 14 and the proximal side end link members 11a to 13a and level with the height above the base bench 62.

As shown in FIG. 17, the control unit 54 of the link actuator 1 also includes the control device 4 for controlling each of the actuators 70 and the position calculating device 59 for calculating the position (θ, φ) of the distal end side link hub 15. The fifth embodiment is basically identical in structure with the previously described second embodiment shown in FIG. 2, although it differs therefrom in respect of the above described structural details, and, yet, in a manner similar to the previously described second embodiment, the proximal side end link members 11a to 13a are assembled in the left direction relative to the proximal end link hub 14. For this reason, by the control device 4 and the position calculating device 59, with the use of the previously discussed relational equations 3 and 4, the control of the actuator 70 and the calculation of the position of the leading side link hub 15 can be accomplished.

The foregoing link actuator 1 is of such a design that because the actuator 70 and the speed reducing mechanism 71 are provided in all of the three link mechanisms 11 to 13, control can be accomplished so as to remove saccadic movement occurring in the link actuator main body 2 and the speed reducing mechanism 71 and, hence, not only is the positioning accuracy of the distal end side link hub 15 be improved, but also the high rigidity of the link actuator itself can be realized.

Also, the gear type speed reducer 73 of the speed reducing mechanism 71 is comprised of a combination of the small gear 76 and the large gear 77 and can obtain a reducing gear ratio equal to or than higher 10. If the reducing gear ratio is high, the positioning resolution of the encoder becomes high and, therefore, the positioning resolution of the distal end side link hub increases. Also, a low output actuator 70 can be used. In this embodiment the actuator 70 equipped with the speed reducer 70a is used, but if the reducing gear ratio of the gear type speed reducer 73 is high, the actuator 70 having no speed reducer equipped can be used and the actuator 70 can therefore be reduced in size.

With the pitch circle radius of the large gear 77 so chosen as to be ½ or more of the arm length L of the proximal side end link members 11a to 13a, the bending moment of the proximal side end link members 11a to 13a resulting from a distal end load becomes small. For this reason, not only is it unnecessary to increase the rigidity of the link actuator to a value higher than necessary, but also the weight of the proximal side end link members 11a to 13a can be reduced. By way of example, material for the proximal side end link members 11a to 13a can be changed from stainless steel (SUS) to aluminum. Also, since the pitch circle radius of the large gear 77 is relatively large, the surface pressure of the threaded portion of the large gear 77 can be reduced and the rigidity of the link actuator 1 becomes high.

Also, if the pitch circle radius of the large gear 77 is greater than ½ of the arm length referred to above, the large gear 77 comes to have a diameter sufficiently greater than the outer diameter of the bearing 131 which is installed in the revolute pair defined by the proximal end side link hub 14 and the proximal side end link members 11a to 13a, and, therefore, a space is available between the threaded portion of the large gear 77 and the bearing 131 and installation of the large gear 77 comes to be easy.

Particularly in the case of the fifth embodiment, since the pitch circle radius of the large gear 77 is greater than the arm length L as described above, the pitch circle radius of the large gear 77 comes to be further large and the previously described functions and effects come to eminently arise. In addition, it becomes possible when the small gear 76 is installed on an outer diametric side than the link mechanisms 11 to 13. As a result, a space for installation of the small gear 76 can be easily obtained and the degree of freedom of designing increased. Yet, the interference between the small gear 76 and any other member will hardly occur and the range of movement of the link actuator 1 becomes large.

Since each of the small gear 76 and the large gear 77 is in the form of a spur gear, the manufacture thereof is easy and the transmission efficiency of rotation is high. Since the small gear 76 is supported by the bearing 80 at its axial opposite ends, the support rigidity of the small gear 76 is high. Accordingly, the angle retentive rigidity of the proximal side end link members 11a to 13a resulting from the distal end load becomes high, leading to the increase of the rigidity of the link actuator 1 and the positioning accuracy thereof. Also, since the rotational axis center O1 of the actuator 70, the rotational axis center O2 of the small gear 76 and the revolute pair center axis S3 between the proximal end link hub 14 and the proximal side end link members 11a to 13a all lie on the same plane, the overall balance is good and the assemblability is also good.

Since the large gear 77 is removable relative to the proximal side end link members 11a to 13a, the specification such as, for example, the reducing gear ratio of the gear type speed reducer 73 and the operating range of the distal end side link hub 15 relative to the proximal end side link hub 14 can be easily changed, resulting in the increase of the productivity of the link actuator 1. In other words, the same link actuator 1 can be made applicable to various applications by merely changing the large gear 77, and the maintenance is good. By way of example, in the event of occurrence of any trouble in the gear type speed reducer 73, mere replacement of only the speed reducer 73 is sufficient to accommodate it.

Although in describing any one of the second to fifth embodiments, the axis angle α of the end link member has been shown and described as 90 degrees, the axis angle α of the end link member may be other than 90 degrees. By way of example, the link actuator main body 2 employed in the practice of a sixth embodiment shown in FIG. 20 is of a rotational symmetrical type as is the case with the fifth embodiment shown in and is of a structure in which the proximal side end link member 5 is assembled in the left direction relative to the proximal end link hub 2 while the axis angle α of the end link member is rendered to be 45 degrees.

As discussed above, when the axis angle α of the end link member is chosen to be not greater than 90 degrees, the interior space inside each of the link mechanisms 11 to 13 can be set large. Accordingly, cables and any other component parts can be installed within the interior space. Also, even though the size of the link actuator is increased, each of the end link members 11a to 13a and 11b to 13b becomes lightweight and a compact structure is accomplished and, hence, the link actuator in its entirety can be downsized.

The proximal end side and distal end side link hubs 14 and 15 of this link actuator main body 2 includes a disc portion 92 having a throughhole 92a defined therein, a support member 93 fixed at three locations circumferentially of the disc portion 92, and a shaft member 94 extending towards an outer diametric side while extending parallel from each of the support member 93 to the disc portion 92. The support member 93 is fixed to the disc portion 92 by means of bolts or the like (not shown). The disc portion 92 of the proximal end side link hub 14 serves as a base for this link actuator 91 and various appliances or the like are fitted to the disc portion 92 of the leading side link hub 15.

Figure 20:
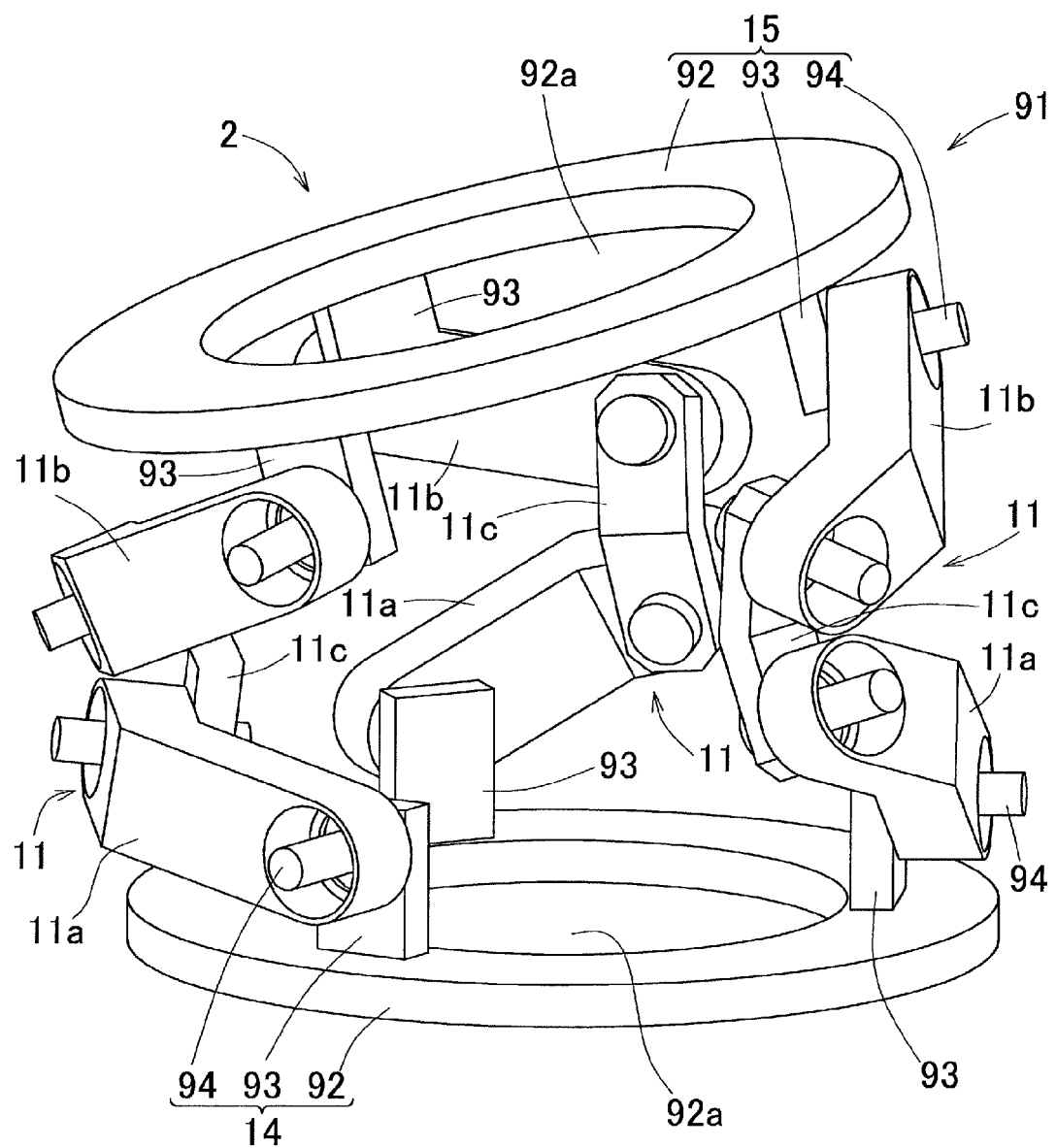
FIG. 20 is a perspective view of the link actuator main body of the link actuator according to a sixth embodiment of the present invention shown in a three dimensional development.
Figure 21A:
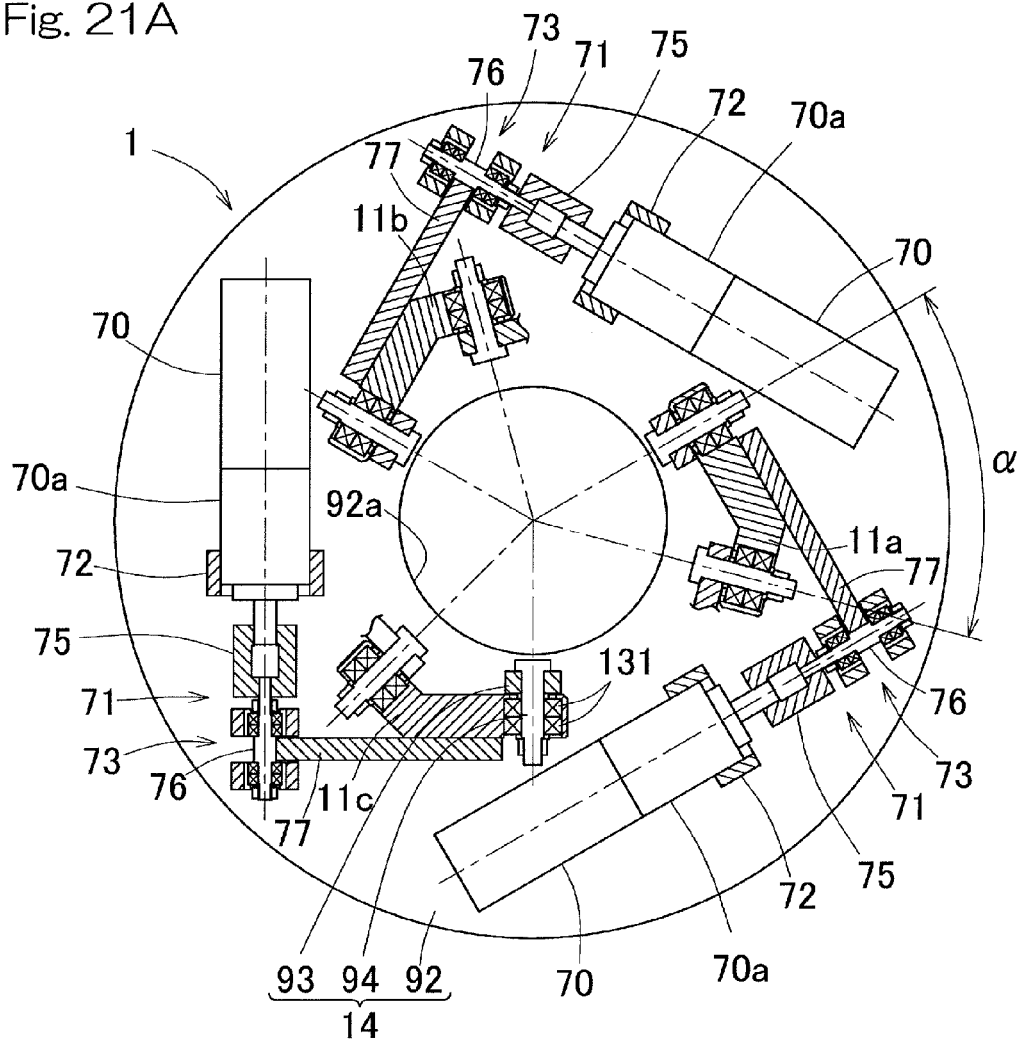
FIG. 21A is a sectional view showing the proximal end side link hub, the proximal side end link member and the intermediate link member of the link actuator in a developed form.
Figure 21B:
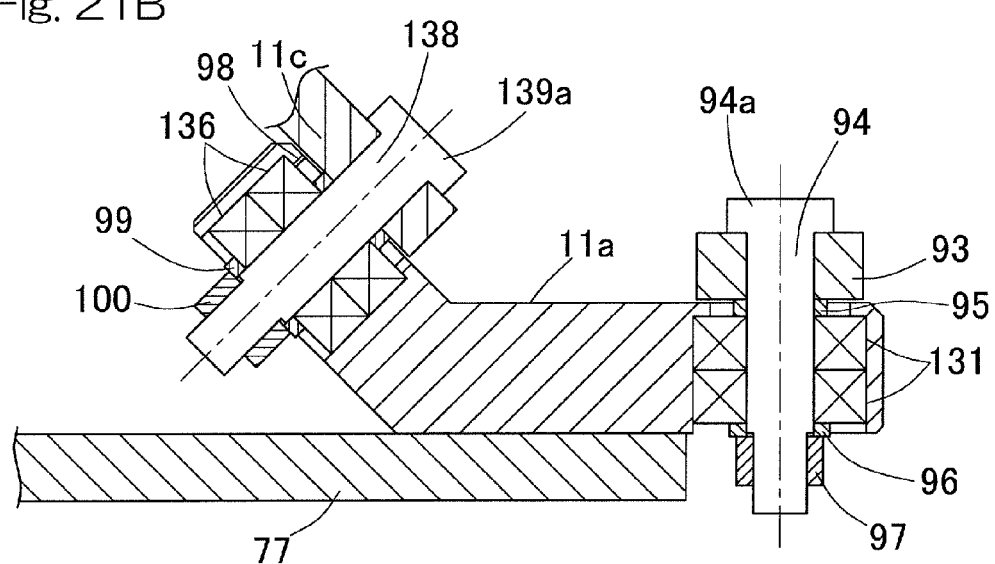
FIG. 21B is a fragmentary enlarged view of FIG. 21A.

FIG. 21A illustrates a sectional view showing the proximal end side link hub 14 of the link actuator 1 provided with the link actuator main body 2 of the structure shown in and described with particular reference to FIG. 20, the proximal side end link members 11a to 13a and the intermediate link members 11c to 13c in deployed form. FIG. 21B is a fragmentary enlarged diagram of FIG. 21A.

The shaft member 94 referred to previously is fixed to the support member 93 by means of, for example, a press fitting technique. And, one end of the end link members 11a to 13a (11b to 13b) is pivotably connected with the shaft member 94 through two bearings 131. The other end of the end link members 11a to 13a (11b to 13b) is pivotably connected with a shaft member 139 of the intermediate link members 11c to 13c through two bearings 136. The shaft member 139 is fixed to the intermediate link members 11c to 13c by means of, for example, a press fitting technique. The intermediate link members 11c to 13c has the shaft member 139 on its opposite ends, and the shaft member 136 on one end thereof is connected with the proximal side end link members 11a to 13a while the shaft member 139 on other end thereof is connected with the distal side end link members 11b to 13b. The bearings 131 and 136 both referred to above are of an outer ring rotating type.

As shown in FIG. 21B, an inner ring (not shown) of the bearing 131 is mounted on the outer periphery of the shaft member 94 of the link hub 14 (15) and two spacers 95 and 96 disposed on this inner ring and on both sides thereof are fastened to a flange portion 94a of the shaft member 94 by means of a nut 97. Accordingly, in a condition in which the preload is applied to the bearing 131, the end link members 11a to 13a (11b to 13b) are pivotably connected with the intermediate link members 11c to 13c.

Also, an inner ring (not shown) of the bearing 136 is mounted on an outer periphery of the shaft member 139 of the intermediate link members 11c to 13c, and two spacers 98 and 99 disposed this inner ring and on opposite sides thereof are fastened to a flange portion 139a of the shaft member 139 by means of a nut 100. Accordingly in a condition in which the preload is applied to the bearing 136, the end link members 11a to 13a (11b to 13b) is pivotably connected with the intermediate link members 11c to 13c. Other structural features are the same as those employed in the fifth embodiment shown in and described with particular reference to FIGS. 17 to 19.

Regarding any one of the second to sixth embodiments of the present invention shown in and described with particular reference to FIG. 8 to FIGS. 21A and 21b, the following is available which is of a construction that does not necessarily require the use of the "position change control unit" and the "relay position setting unit".

[Mode 1]

The link actuator according to Mode 1 is of such a design that the distal end side link hub is connected with the proximal end side link hub through the three link mechanisms for alteration in position; each of the link mechanisms includes the proximal end side and distal side end link members, which are pivotably connected at one end with the proximal end side link hub and the distal end side link hub, respectively, and the intermediate link member having its opposite ends pivotably connected with the other ends of the proximal end side and distal side end link member; the connecting end axis of the intermediate link member, which is pivotably connected with the proximal side end link member, and the connecting end axis of the intermediate link member, which is pivotably connected with the distal side end link member cooperate with each other to form the angle γ therebetween; the connecting end axis of the intermediate link member, which is pivotably connected with the proximal end side and distal side end link members, and the connecting end axis of the proximal end side and distal end side link hubs, which are pivotably connected with the proximal end side and distal end side link members, cooperate with each other to form the angle α therebetween; each of the link mechanisms is of such a design that the geometric model of the link mechanism depicted by line represents such a shape as to form the symmetry between the proximal end side part and the distal end side part with respect to the center part of the intermediate link member; the actuator is provided in the two of the three link mechanisms for arbitrarily changing the position of the distal end side link hub relative to the proximal end side link hub; and the control device for controlling those actuators is provided.

The link actuator according to Mode 1 is of such a design that in the basic construction described above, assuming that the rotational angle of the proximal side end link member relative to the proximal end side link hub is expressed by $\beta n$ ($n=1, 2, 3, \ldots$); the circumferential separating angle of each of the proximal side end link members relative to the proximal side end link member forming the reference is expressed by $\delta n$ ($n=1, 2, 3, \ldots$); the vertical angle at which the center axis of the distal end side link hub is inclined relative to the center axis of the proximal end side link hub is expressed by $\theta$; the horizontal angle at which the center axis of the distal end side link hub is inclined relative to the center axis of the proximal end side link hub is expressed by $\phi$; the circumferential separating angle of each of the revolute pairs relative to the phase forming the reference in the circumference through which the revolute pair defined by the proximal side end link member and the intermediate link member passes is expressed by $\varepsilon n$ ($n=1, 2, 3, \ldots$); and the separating angle of the revolute pair, defined by the proximal side end link member forming the reference and the intermediate link member, during a condition in which the position of the distal end side link hub relative to the proximal end side link hub lies in the position of origin ($\theta=0$, $\phi=0$), is expressed by $\varepsilon 0$, the control device is operable, so as to satisfy the following equations 1 and 2, to determine the desired rotational angle $\beta n$ of the proximal side end link member from the targeted position ($\theta$, $\phi$) of the distal end side link hub relative to the proximal end side link hub by means of the inverse transformation of the equation 1 and, then, to control each of the actuators to satisfy the rotational angle $\beta n$ so determined:

$$\begin{pmatrix} \cos(\gamma/2)\cos\varepsilon 0 \\ \pm\sin\alpha\cos\beta n \\ \sin\alpha\sin\beta n \end{pmatrix} = $$

$$\begin{pmatrix} \cos(\phi-\delta n) & -\sin(\phi-\delta n) & 0 \\ \sin(\phi-\delta n) & \cos(\phi-\delta n) & 0 \\ 0 & 0 & 1 \end{pmatrix} \begin{pmatrix} \cos(\theta/2) & 0 & \sin(\theta/2) \\ 0 & 1 & 0 \\ -\sin(\theta/2) & 0 & \cos(\theta/2) \end{pmatrix}$$

$$\begin{pmatrix} \cos(\phi-\delta n) & \sin(\phi-\delta n) & 0 \\ -\sin(\phi-\delta n) & \cos(\phi-\delta n) & 0 \\ 0 & 0 & 1 \end{pmatrix} \begin{pmatrix} \cos(\gamma/2)\cos\varepsilon n \\ \cos(\gamma/2)\sin\varepsilon n \\ \sin(\gamma/2) \end{pmatrix}$$

Equation 1

$$\varepsilon_0 = \pm\sin^{-1}\left(\sqrt{\frac{\sin^2\alpha - \sin^2(\gamma/2)}{\cos^2(\gamma/2)}}\right).$$

Equation 2

In Mode 1 discussed above, with respect to at least two of the three sets or more of the link mechanisms, if the rotational angle $\beta n$ of the proximal side end link member is fixed, the position of the distal end side link hub relative to the proximal end side link hub is fixed correspondingly. Accordingly, when the actuator is provided in two or more sets of the three sets or more sets of the link mechanisms and those actuators are properly controlled, the position (θ, φ) of the distal end side link hub relative to the proximal end side link hub can be arbitrarily changed.

[Mode 2]

The link actuator according to Mode 2 is of such a design that in the basic construction described above, assuming that the rotational angle of the proximal side end link member relative to the proximal end side link hub is expressed by βn (n=1, 2, 3, . . . ); the circumferential separating angle of each of the proximal side end link members relative to the proximal side end link member forming the reference is expressed by δn (n=1, 2, 3, . . . ); the vertical angle at which the center axis of the distal end side link hub is inclined relative to the center axis of the proximal end side link hub is expressed by θ; the horizontal angle at which the center axis of the distal end side link hub is inclined relative to the center axis of the proximal end side link hub is expressed by φ; the circumferential separating angle of each of the revolute pairs relative to the phase forming the reference in the circumference through which the revolute pair defined by the proximal side end link member and the intermediate link member passes is expressed by δn (n=1, 2, 3, . . . ); and the separating angle of the revolute pair, defined by the proximal side end link member forming the reference and the intermediate link member, while the position of the distal end side link hub relative to the proximal end side link hub lies in the position of origin (θ=0, φ=0) is expressed by ε0, the provision is made of the position calculating device for determining the position (θ, φ) of the distal end side link hub relative to the current proximal end side link hub from the rotational angle βn of the proximal side end link member by means of the inverse transformation of the equation 1:

$$\begin{pmatrix} \cos(\gamma/2)\cos\varepsilon 0 \\ \pm\sin\alpha\cos\beta n \\ \sin\alpha\sin\beta n \end{pmatrix} = $$

$$\begin{pmatrix} \cos(\phi-\delta n) & -\sin(\phi-\delta n) & 0 \\ \sin(\phi-\delta n) & \cos(\phi-\delta n) & 0 \\ 0 & 0 & 1 \end{pmatrix} \begin{pmatrix} \cos(\theta/2) & 0 & \sin(\theta/2) \\ 0 & 1 & 0 \\ -\sin(\theta/2) & 0 & \cos(\theta/2) \end{pmatrix}$$

$$\begin{pmatrix} \cos(\phi-\delta n) & \sin(\phi-\delta n) & 0 \\ -\sin(\phi-\delta n) & \cos(\phi-\delta n) & 0 \\ 0 & 0 & 1 \end{pmatrix} \begin{pmatrix} \cos(\gamma/2)\cos\varepsilon n \\ \cos(\gamma/2)\sin\varepsilon n \\ \sin(\gamma/2) \end{pmatrix}$$

$$\varepsilon_0 = \pm\sin^{-1}\left(\sqrt{\frac{\sin^2\alpha - \sin^2(\gamma/2)}{\cos^2(\gamma/2)}}\right). \quad \text{Equation 2}$$

[Mode 3]

In Mode 1 or Mode 2, the positive or negative on the second line in the left side of the equation 1 above and the positive or negative in the right side of the equation 2 above are recommended to fix depending on the direction of assembly of the proximal end side end link relative to the proximal end side link hub.

[Mode 4]

In Mode 1 or Mode 2, the axis angle α of the end link member is preferably chosen to be 90 degrees.

[Mode 5]

In Mode 1 or Mode 2, the axis angle α of the end link member may be not greater than 90 degrees.

Although the present invention has been fully described in connection with the embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS

1 . . . Link actuator
2 . . . Link actuator main body
3, 70 . . . Actuator
4 . . . Control device
14 . . . Proximal end side link hub
15 . . . Distal end side link hub
11 to 13 . . . Link mechanism
11a, 12a, 13a . . . Proximal side end link member (Arm)
11b, 12b, 13b . . . Distal side end link member
11c, 12c, 13c . . . Intermediate link member
41 . . . Position change control unit
42 . . . Relay position setting unit
59 . . . Position calculating device
E . . . Circumference
QA . . . Center axis of the proximal end side link hub
QB . . . Center axis of the distal end side link hub
T1 . . . Revolute pair portion defined by the proximal side end link member and the intermediate link

What is claimed is:

1. A control device for a link actuator to control each of actuators of the link actuator in such a manner as to change position of a distal end side link hub relative to a proximal end side link hub from a starting point position towards a terminating point position which is commanded, in which the link actuator includes three or more link mechanisms that connect the distal end side link hub to the proximal end side link hub in a position-changeable fashion, each link mechanisms including a proximal side end link member, one end of the proximal side end link member being pivotably connected to the proximal end side link hub; a distal side end link member, one end of the distal side end link member being pivotably connected to the distal end side link hub; and an intermediate link member with its opposite ends pivotably connected to the other ends of the proximal side end link member and the distal side end link member, respectively, each of the link mechanisms having such a shape that a geometric model of the link mechanism represented by lines shows symmetry between a proximal end side portion thereof and a distal end side portion thereof with respect to a center portion of the intermediate link member, and each link mechanisms being provided with the actuator that arbitrarily changes position of the distal end side link hub relative to the proximal end side link hub by rotating the proximal side end link member in the form of the arm, the control device comprising:

a position change control unit to drive each of the actuators in synchronism with each other on a point-to-point basis from a starting point, which is the rotational angle of the arm when the starting point position is assumed, to a terminating point which is the rotational angle when the terminating point position is assumed;

a relay position setting unit configured to compare a position changing amount of the distal end side link hub in the position change from the starting point position to the terminating point position with a predetermined amount, and configured to, in the event that the position changing amount of the distal end side link hub is larger than the predetermined amount, set one or more relay position according to a predetermined rule during the course of an position changing path for changing from the starting point position to the terminating point position and to set by determining a rotational angle which corresponds to a relay point of the rotational path of each of the arms when the relay position is assumed, wherein the position change control unit performs a position control so that each of the arms simultaneously passes through the relay point set by the relay position change setting unit.

2. The control device for the link actuator as claimed in claim 1, wherein the relay position setting unit divides the rotational amount of each of the arms on the basis of a division number by which the position change amount of the distal end side link hub from the starting point position to the terminating point position is divided into an amount smaller than a predetermined amount.

3. The control device for the link actuator as claimed in claim 1, wherein three link members are provided and the relay position setting unit sets the relay point according to the rule, the rule including: selecting two arms out of the three arms which operate during the course of changing the position from the starting point position of the distal end side link hub to the terminating point position; equally dividing the rotational path of the selected two arms; and setting the position of the remaining one arm at a position uniquely determined according to a relative positional relationship with the other two arms.

4. The control device for the link actuator as claimed in claim 3, wherein as a criterion for selecting the two arms out of the three arms, the arms having large rotational amounts are selected.

5. The control device for the link actuator as claimed in claim 3, wherein the position ($\theta$, $\phi$) of the distal end side link hub is determined from the rotational angle of the selected two arms by a transformation equation of forward transformation, and the rotational angle of the remaining one arm is determined by a transformation equation of inverse transformation from the position ($\theta$, $\phi$) of the distal end side link hub.

6. The control device for the link actuator as claimed in claim 5, wherein the position ($\theta$, $\phi$) of the distal end side link hub is determined by a convergence calculation with the use of the rotational angle of the two arms out of the three arms and a transformation equation.

7. The control device for the link actuator as claimed in claim 1, wherein the relay position setting unit utilizes the predetermined rule for determining the relay point of each of the arm, and in the rule one or more relay positions on a path through which the distal end side link hub moves in the shortest distance and sets the rotational angle of each of the arms to be the relay point, the rotational angle corresponding to the position ($\theta$, $\phi$) of the distal end side link hub on the path, which position is any one of the starting point position, the relay position and the terminating point position on the path and the value achieved between the neighboring positions attains a value smaller than a predetermined value.

8. The control device for the link actuator as claimed in claim 7, wherein the rotational angle of each of the arms is determined from the position ($\theta$, $\phi$) of the distal end side link hub by means of the transformation equation of inverse transformation.

9. The control device for the link actuator as claimed in claim 1, wherein three link mechanisms are provided, and, from the starting point position ($\theta a$, $\phi a$) and the terminating point position ($\theta b$, $\phi b$) of the distal end side link hub, the position ($\theta 1$, $\theta 2$, ... $\theta n$, $\phi 1$, $\phi 2$, ... $\phi n$) (wherein n is equal to the division number minus 1) of each of the distal end side link hubs, in which the moving amount $\Delta\theta$ of the bending angle $\theta$ and the moving amount $\Delta\phi$ of the pivot angle $\Delta\theta$ attains a value smaller than a predetermined moving amount, is determined according to the transformation equation of inverse transformation and the position ($\theta 1$, $\theta 2$, ... $\theta n$, $\phi 1$, $\phi 2$, ... $\phi n$) of the distal end side link hub so determined is set to be the relay position.

10. The control device for the link actuator as claimed in claim 1, wherein the position change control unit performs a positional control from the starting point position of the distal end side link hub to the terminating point position thereof without acceleration and deceleration over the entire zone except for an acceleration zone, in which the position change starts from the starting position, and a deceleration zone in which deceleration takes place immediately before the terminating point position is attained.

11. The control device for the link actuator as claimed in claim 1, wherein, assuming that in the link actuator a connecting end axis of the intermediate link member, which is pivotably connected with the proximal side end link member, and a connecting end axis of the intermediate link member, which is pivotably connected with the distal side end link member cooperate with each other to form an angle $\gamma$ therebetween, and connecting end axes of the intermediate link member, which are pivotably connected with the proximal end side and distal side end link members, and connecting end axes of the proximal end side link hub and the distal end side link hub, which are pivotably connected with the proximal end side link member and the distal end side link member, respectively, cooperate with each other to form angles $\alpha$ therebetween, respectively, and; that a rotational angle of the proximal side end link member relative to the proximal end side link hub is expressed by $\beta n$ (n=1, 2, 3, ... ); a circumferential separating angle of each of the proximal side end link members relative to the proximal side end link member forming a reference is expressed by $\delta n$ (n=1, 2, 3, ... ); a vertical angle at which the center axis of the distal end side link hub is inclined relative to the center axis of the proximal end side link hub is expressed by $\theta$; a horizontal angle at which the center axis of the distal end side link hub is inclined relative to the center axis of the proximal end side link hub is expressed by $\phi$, and also assuming that, where on a circumference through which a revolute pair portion of the proximal side end link member and the intermediate link member passes, a circumference separating angle of each of a revolute pair portions relative to a phase forming a reference is expressed by $\epsilon n$ (n=1, 2, 3, ... ) and a separating angle of the revolute pair portion of the proximal side end link member and the intermediate link member during a condition in which the position of the distal end side link hub relative to the proximal end side link hub is held in the position of origin ($\theta=0$, $\phi=0$) forming a reference is expressed by $\epsilon 0$;

each of the actuators is controlled to determine the rotational angle $\beta n$ of the proximal side end link member from the position ($\theta$, $\phi$) of the distal end side link hub relative to the proximal end side link hub forming a target and then to set the determined rotational angle $\beta n$ to be a desired rotational angle by means of the inverse transformation of the following equation 1 so that the relationship expressed by the following relational equations is satisfied:

$$\begin{pmatrix} \cos(\gamma/2)\cos\varepsilon 0 \\ \pm\sin\alpha\cos\beta n \\ \sin\alpha\sin\beta n \end{pmatrix} = $$

$$\begin{pmatrix} \cos(\phi-\delta n) & -\sin(\phi-\delta n) & 0 \\ \sin(\phi-\delta n) & \cos(\phi-\delta n) & 0 \\ 0 & 0 & 1 \end{pmatrix} \begin{pmatrix} \cos(\theta/2) & 0 & \sin(\theta/2) \\ 0 & 1 & 0 \\ -\sin(\theta/2) & 0 & \cos(\theta/2) \end{pmatrix}$$

$$\begin{pmatrix} \cos(\phi-\delta n) & \sin(\phi-\delta n) & 0 \\ -\sin(\phi-\delta n) & \cos(\phi-\delta n) & 0 \\ 0 & 0 & 1 \end{pmatrix} \begin{pmatrix} \cos(\gamma/2)\cos\varepsilon n \\ \cos(\gamma/2)\sin\varepsilon n \\ \sin(\gamma/2) \end{pmatrix}$$

Equation 1

$$\varepsilon_0 = \pm\sin^{-1}\left(\sqrt{\frac{\sin^2\alpha - \sin^2(\gamma/2)}{\cos^2(\gamma/2)}}\right).$$

Equation 2

12. The control device for the link actuator as claimed in claim 1, further comprising a position calculating device, wherein, assuming that in the link actuator a connecting end axis of the intermediate link member, which is pivotably connected with the proximal side end link member, and a connecting end axis of the intermediate link member, which is pivotably connected with the distal side end link member cooperate with each other to form an angle $\gamma$ therebetween, and connecting end axes of the intermediate link member, which are pivotably connected with the proximal end side and distal side end link members, and connecting end axes of the proximal end side link hub and the distal end side link hub, which are pivotably connected with the proximal end side link member and the distal end side link member, respectively, cooperate with each other to form angles $\alpha$ therebetween, respectively, and; that a rotational angle of the proximal side end link member relative to the proximal end side link hub is expressed by $\beta n$ (n=1, 2, 3, . . . ); a circumferential separating angle of each of the proximal side end link members relative to the proximal side end link member forming a reference is expressed by $\delta n$ (n=1, 2, 3, . . . ); a vertical angle at which the center axis of the distal end side link hub is inclined relative to the center axis of the proximal end side link hub is expressed by $\theta$; a horizontal angle at which the center axis of the distal end side link hub is inclined relative to the center axis of the proximal end side link hub is expressed by $\phi$, and also assuming that, where on a circumference through which a revolute pair portion of the proximal side end link member and the intermediate link member passes, a circumference separating angle of each of a revolute pair portions relative to a phase forming a reference is expressed by $\varepsilon n$ (n=1, 2, 3, . . . ) and a separating angle of the revolute pair portion of the proximal side end link member and the intermediate link member during a condition in which the position of the distal end side link hub relative to the proximal end side link hub is held in the position of origin ($\theta$=0, $\phi$=0) forming a reference is expressed by $\varepsilon 0$;

the position calculating device calculates the position ($\theta$, $\phi$) of the distal end side link hub relative to the current proximal end side link hub from the rotational angle $\beta n$ of the proximal side end link member by forward-transforming the following equation 1:

$$\begin{pmatrix} \cos(\gamma/2)\cos\varepsilon 0 \\ \pm\sin\alpha\cos\beta n \\ \sin\alpha\sin\beta n \end{pmatrix} = $$

$$\begin{pmatrix} \cos(\phi-\delta n) & -\sin(\phi-\delta n) & 0 \\ \sin(\phi-\delta n) & \cos(\phi-\delta n) & 0 \\ 0 & 0 & 1 \end{pmatrix} \begin{pmatrix} \cos(\theta/2) & 0 & \sin(\theta/2) \\ 0 & 1 & 0 \\ -\sin(\theta/2) & 0 & \cos(\theta/2) \end{pmatrix}$$

$$\begin{pmatrix} \cos(\phi-\delta n) & \sin(\phi-\delta n) & 0 \\ -\sin(\phi-\delta n) & \cos(\phi-\delta n) & 0 \\ 0 & 0 & 1 \end{pmatrix} \begin{pmatrix} \cos(\gamma/2)\cos\varepsilon n \\ \cos(\gamma/2)\sin\varepsilon n \\ \sin(\gamma/2) \end{pmatrix}$$

Equation 1

$$\varepsilon_0 = \pm\sin^{-1}\left(\sqrt{\frac{\sin^2\alpha - \sin^2(\gamma/2)}{\cos^2(\gamma/2)}}\right).$$

Equation 2

13. The control device for the link actuator as claimed in claim 11, wherein the positive or negative on the second line in the left side of the Equation 1 and the positive or negative on the right side of the Equation 2 are determined depending on the direction of assembly of the proximal end side end link relative to the proximal end side link hub.

14. The control device for the link actuator as claimed in claim 11, wherein the axis angle $\alpha$ of the end link member is 90 degrees.

15. The control device for the link actuator as claimed in claim 11, wherein the axis angle $\alpha$ of the end link member is not greater than 90 degrees.

16. The control device for the link actuator as claimed in claim 12, wherein the positive or negative on the second line in the left side of the Equation 1 and the positive or negative on the right side of the Equation 2 are determined depending on the direction of assembly of the proximal end side end link relative to the proximal end side link hub.

17. The control device for the link actuator as claimed in claim 12, wherein the axis angle $\alpha$ of the end link member is 90 degrees.

18. The control device for the link actuator as claimed in claim 12, wherein the axis angle $\alpha$ of the end link member is not greater than 90 degrees.

* * * * *